US008688485B2

(12) United States Patent
Williamson et al.

(10) Patent No.: US 8,688,485 B2
(45) Date of Patent: Apr. 1, 2014

(54) LOW FARE SEARCH FOR TICKET CHANGES USING MARRIED SEGMENT INDICATORS

(75) Inventors: Todd Williamson, Charlestown, MA (US); Carl De Marcken, Seattle, WA (US); James Knight, Somerville, MA (US); Daniel J. Thumim, Newton, MA (US)

(73) Assignee: Google Inc., Mountain View, CA (US)

( * ) Notice: Subject to any disclaimer, the term of this patent is extended or adjusted under 35 U.S.C. 154(b) by 761 days.

(21) Appl. No.: 11/607,444

(22) Filed: Dec. 1, 2006

(65) Prior Publication Data

US 2008/0010103 A1    Jan. 10, 2008

Related U.S. Application Data

(60) Provisional application No. 60/806,665, filed on Jul. 6, 2006.

(51) Int. Cl.
*G06Q 10/00* (2012.01)
*G06Q 50/00* (2012.01)

(52) U.S. Cl.
USPC ............................................................ 705/5

(58) Field of Classification Search
USPC ........................................................ 705/5–6
See application file for complete search history.

(56) References Cited

U.S. PATENT DOCUMENTS

| | | | |
|---|---|---|---|
| 5,649,182 A | 7/1997 | Reitz | |
| 5,761,389 A | 6/1998 | Maeda et al. | |
| 6,205,377 B1 | 3/2001 | Lupash et al. | |
| 6,275,808 B1 | 8/2001 | Demarcken | |
| 6,281,836 B1 | 8/2001 | Lupash et al. | |
| 6,609,098 B1 | 8/2003 | DeMarcken | |
| 6,650,998 B1 | 11/2003 | Rutledge et al. | |
| 6,959,282 B2 | 10/2005 | Kakihara et al. | |
| 7,143,099 B2 | 11/2006 | Lecheler-Moore et al. | |
| 7,249,033 B1 | 7/2007 | Close et al. | |
| 7,343,319 B1 | 3/2008 | Walker et al. | |
| 7,346,520 B2 | 3/2008 | Etzioni et al. | |
| 7,487,108 B2 | 2/2009 | Aoki et al. | |
| 2002/0052854 A1 | 5/2002 | Baggett | |
| 2002/0143587 A1 | 10/2002 | Champernowne | |
| 2002/0152100 A1 | 10/2002 | Chen et al. | |
| 2002/0178034 A1 * | 11/2002 | Gardner et al. | 705/5 |
| 2003/0069836 A1 | 4/2003 | Penney et al. | |

(Continued)

FOREIGN PATENT DOCUMENTS

WO    WO 0225557 A2 *    3/2002

OTHER PUBLICATIONS

Best, Worldspan Lesson: Advanced Segment Sell, Jun. 12, 2002, archive dated copy (Aug. 24, 2003) available at http://web.archive.org/web/20030824042024/http://globallearningcenter.wspan.com/learningcenter/PDFs/Virtual+Outlines/Availability+and+PNR/Segment+Sell.pdf.*

(Continued)

*Primary Examiner* — Daniel Vetter
(74) *Attorney, Agent, or Firm* — Fish & Richardson P.C.

(57) ABSTRACT

Systems and techniques for managing ticket changes are described. for managing changes to a purchased ticket. A married segment indicator associated with first and second married flight segments of the purchased ticket is located. It is determined whether changes to the purchased ticket affect existing bookings of the first and second married flight segments. Based on the determination, a replacement ticket is constructed to include the first and second married flight segments of the purchased ticket utilizing the existing booked inventory; otherwise, a replacement ticket is constructed using current availability information for the first and second married flight segments from the replacement ticket.

18 Claims, 16 Drawing Sheets

(56) References Cited

U.S. PATENT DOCUMENTS

| | | | |
|---|---|---|---|
| 2004/0010427 A1 | 1/2004 | Barnes et al. | |
| 2005/0033689 A1 | 2/2005 | Bonalle et al. | |
| 2005/0096946 A1* | 5/2005 | Janakiraman et al. | 705/5 |
| 2005/0102259 A1 | 5/2005 | Kapur | |
| 2005/0125265 A1 | 6/2005 | Bramnick et al. | |
| 2005/0165628 A1 | 7/2005 | Vaaben et al. | |
| 2005/0256750 A1 | 11/2005 | Hand et al. | |
| 2005/0288973 A1* | 12/2005 | Taylor et al. | 705/5 |
| 2006/0026014 A1* | 2/2006 | Bolduc et al. | 705/1 |
| 2007/0011034 A1 | 1/2007 | Jones et al. | |
| 2007/0055555 A1* | 3/2007 | Baggett et al. | 705/5 |
| 2007/0115373 A1 | 5/2007 | Gallagher et al. | |
| 2007/0192229 A1 | 8/2007 | Rowan | |
| 2007/0192321 A1 | 8/2007 | Farr et al. | |
| 2007/0294615 A1 | 12/2007 | Sathe | |
| 2008/0010101 A1 | 1/2008 | Williamson et al. | |
| 2008/0010102 A1 | 1/2008 | Williamson et al. | |
| 2008/0041945 A1 | 2/2008 | Williamson et al. | |
| 2008/0154632 A1 | 6/2008 | Jacobi et al. | |
| 2008/0177728 A1 | 7/2008 | Bowman et al. | |
| 2008/0237141 A1 | 10/2008 | Kerfoot | |
| 2009/0030746 A1 | 1/2009 | Etzioni et al. | |

OTHER PUBLICATIONS

International Search Report and Written Opinion from corresponding Application No. PCT/US2007/072497, dated Jan. 22, 2008; 16 pgs.

U.S. Appl. No. 11/607,805, filed Dec. 1, 2006, Low Fare Search for Ticket Changes, Williamson, et al.

U.S. Appl. No. 11/607,427, filed Dec. 1, 2006, Determining Reissue Methods for Ticket Changes, Williamson, et al.

U.S. Appl. No. 11/607,804, filed Dec. 1, 2006, Ticket Reconstruction, Williamson, et al.

U.S. Appl. No. 11/607,433, filed Dec. 1, 2006, Historical Database, Williamson, et al.

Worldspan Agent Assistance—Pricing System, WebArchive dated Nov. 13, 2004 of page last updated May 23, 2003, available at http://web.archive.org/web/20041113055456/http://globallearningcenter.wspan.com/learningcenter/efg/pricing.htm.

Worldspan Agent Assistance—Rapid Reprice, WebArchive dated Jun. 30, 2004, available at http://web.archive.org/web/20040630151837/http://globallearningcenter.wspan.com/learningcenter/efg/rapid_reprice.htm.

Worldspan Lesson:Fares, WebArchive dated Jul. 1, 2004, available at http://web.archive.org/web/20040701002904/http://globallearningcenter.wspan.com/emealearningcenter/PDFs/Student+Workbooks/205/0302+Fares+205.pdf.

Sorenson, International Air Fares: Construction and Ticketing, 1995, South-Western Pub. Co., Ch. 12—Ticket Exchanges, pp. 249-270.

Authorized officer Philippe Becamel, International Preliminary Report on Patentability in PCT/US2007/072497, mailed Jan. 15, 2009, 11 pages.

\* cited by examiner

160

Trips on Delta Air Lines

Sort by Cost  Airline From/To     Stops   Date                    Flight times    Duration Class  Warnings 1 Details $388 Delta  BOS to LAX nonstop Tue, Apr 18           5:15p-8:42p    6h 27m Coach  overnight flight
                      LAX to BOS nonstop Tue-Wed, Apr 25-26 9:30p-5:59a    5h 29m Coach 2 Details $394 Delta  BOS to LAX nonstop Tue, Apr 18           5:15p-8:42p    6h 27m Coach
                      LAX to BOS   SLC   Tue, Apr 25           1:05p-11:21p   7h 16m Coach 3 Details $394 Delta  BOS to LAX nonstop Tue, Apr 18           5:15p-8:42p    6h 27m Coach  overnight flight
                      LAX to BOS   JFK   Tue-Wed, Apr 25-26 10:00p-8:25a   7h 25m Coach ITA Software Legal notice: Search results provided are the property of ITA Software, Inc. and may be protected by trademark, copyright, patent and other rights. Any use of the search results is governed by our Terms of Use Policy and End-User License. ©1999-2005 ITA Software, Inc.

1 Details $397 Delta  BOS to LAX nonstop Tue, Apr 18 5:15p-8:42p  6h 27m Coach  overnight flight
                      LAX to BOS nonstop Tue, Apr 25 7:15a-12:44p 5h 43m Coach
(original itinerary)

Trips on Delta Air Lines

Sort by Cost  Airline From/To     Stops   Date                    Flight times    Duration Class  Warnings 1 Details $388 Delta  BOS to LAX nonstop Tue, Apr 18           5:15p-8:42p    6h 27m Coach  overnight flight
                      LAX to BOS nonstop Tue-Wed, Apr 25-26 9:30p-5:59a    5h 29m Coach 2 Details $394 Delta  BOS to LAX nonstop Tue, Apr 18           5:15p-8:42p    6h 27m Coach
                      LAX to BOS   SLC   Tue, Apr 25           1:05p-11:21p   7h 16m Coach 3 Details $394 Delta  BOS to LAX nonstop Tue, Apr 18           5:15p-8:42p    6h 27m Coach  overnight flight
                      LAX to BOS   JFK   Tue-Wed, Apr 25-26 10:00p-8:25a   7h 25m Coach ITA Software Legal notice: Search results provided are the property of ITA Software, Inc. and may be protected by trademark, copyright, patent and other rights. Any use of the search results is governed by our Terms of Use Policy and End-User License. ©1999-2005 ITA Software, Inc.

1 Details $397 Delta  BOS to LAX nonstop Tue, Apr 18 5:15p-8:42p  6h 27m Coach  overnight flight
                      LAX to BOS nonstop Tue, Apr 25 7:15a-12:44p 5h 43m Coach
(original itinerary)

Trips on Delta Air Lines

Sort by Cost  Airline From/To     Stops   Date                    Flight times    Duration Class  Warnings 1 Details $388 Delta  BOS to LAX nonstop Tue, Apr 18           5:15p-8:42p    6h 27m Coach  overnight flight
                      LAX to BOS nonstop Tue-Wed, Apr 25-26 9:30p-5:59a    5h 29m Coach 2 Details $394 Delta  BOS to LAX nonstop Tue, Apr 18           5:15p-8:42p    6h 27m Coach
                      LAX to BOS   SLC   Tue, Apr 25           1:05p-11:21p   7h 16m Coach 3 Details $394 Delta  BOS to LAX nonstop Tue, Apr 18           5:15p-8:42p    6h 27m Coach  overnight flight
                      LAX to BOS   JFK   Tue-Wed, Apr 25-26 10:00p-8:25a   7h 25m Coach ITA Software Legal notice: Search results provided are the property of ITA Software, Inc. and may be protected by trademark, copyright, patent and other rights. Any use of the search results is governed by our Terms of Use Policy and End-User License. ©1999-2005 ITA Software, Inc.

LOW FARE SEARCH FOR TICKET CHANGES USING MARRIED SEGMENT INDICATORS

CROSS-RELATED APPLICATION

Under 35 U.S.C. 119(e)(1), this application claims the benefit of provisional application Ser. No. 60/806,665, filed Jul. 6, 2006, entitled, "LOW FARE SEARCH FOR TICKET CHANGES."

TECHNICAL FIELD

This invention relates to computerized travel planning systems, and more particularly to managing ticket changes.

BACKGROUND

Travel planning systems are used to produce itineraries and prices by selecting suitable travel units from databases containing geographic, scheduling and pricing information. In the airline industry, fundamental travel units include "flights" (sequences of regularly scheduled takeoffs and landings assigned a common identifier) and "fares" (prices published by airlines for travel between two points). The term "itinerary" corresponds to a sequence of flights on particular dates and the term "pricing solution" corresponds to a combination of fares and itineraries that satisfies a travel request and which can be used to provide a ticket for transportation. Travel planning systems such as those offered by various web-sites and computer reservation systems enables individual consumers and travel agents, alike, to search for available faring solutions satisfying a travel query. One such system is the "QPX" travel planning system by ITA Software®. Aspects of the QPX travel planning system are described in U.S. Pat. No. 6,275,808 and assigned to the assignee of the present application and incorporated herein by reference. The faring solutions that are returned to the user (i.e., an individual consumer or travel agent) include all of the information required to book and ticket the itinerary directly in a carrier's inventory system or in a computer reservation system (CRS). For booking a trip, QPX enables users to retrieve a wide range of prices and itineraries of available tickets.

SUMMARY

If a user wishes to make a change to an already purchased ticket, determining pricing solutions for the change is a complex and convoluted process that most often yields an extremely large number of possible pricing solutions; because it is possible to purchase a new ticket and discard the existing ticket, the total number of possible solutions to a ticket change request is strictly larger than the set of possible new tickets that satisfy the user's request.

The invention provides systems and methods, including computer program products, for managing changes to purchased tickets.

In general, in one aspect, the invention features a system including one or more processors configured to locate a married segment indicator associated with first and second married flight segments of the purchased ticket; determine whether changes to the purchased ticket do not affect existing bookings of the first and second married flight segments; if the ticket changes do not affect the existing booking at least one of the first and second married flight segments, construct a replacement ticket including changes to the purchased ticket, the replacement ticket including the first and second married flight segments of the purchased ticket utilizing the existing booked inventory; otherwise, if the ticket changes affect at least one of the first and second married flight segments, using current availability information for the first and second married flight segments from the replacement ticket.

In general, in another aspect, the invention features a method and a computer program product for presenting travel information to a user. The method includes locating a married segment indicator associated with first and second married flight segments of the purchased ticket; determining whether changes to the purchased ticket do not affect existing bookings of the first and second married flight segments; if the ticket changes do not affect the existing booking at least one of the first and second married flight segments, constructing a replacement ticket including changes to the purchased ticket, the replacement ticket including the first and second married flight segments of the purchased ticket utilizing the existing booked inventory; otherwise, if the ticket changes affect at least one of the first and second married flight segments, using current availability information for the first and second married flight segments from the replacement ticket.

Embodiments may include one or more of the following. It may be determined that the changes affect the existing booking of one of the first and second married flight segments of the purchased ticket; and a candidate replacement ticket including the married flight segment may be discarded. A response to an availability query associated with the replacement ticket may be received. The response may include a married segment indicator associated with the first and second married flight segments of the replacement ticket. The married segment indicator may indicate that the first and second flight segments held in the passenger name record of the purchased ticket are to be considered as one indivisible unit of travel. The changes may affect a destination airport of one of the first and second married flight segment. The first and second married flight segments from the purchased ticket may be used when constructing the replacement ticket if the changes do not affect the first and second married flight segments of the purchased ticket.

One or more of the aspects of the invention may provide one or more of the following advantages. Airlines spend less money on travel agents who perform refunds or reissuing of tickets, and airlines' rules for refunding or reissuing tickets are enforced more uniformly. An automated system instructs travel agents how to refund or reissue a ticket, reducing costly "debit memos" from the airlines. The end user is presented with all available options for changing their ticket and, as a result, can make an informed decision about how to proceed with exchanging the ticket for a refund or a new ticket.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 11A-11E show different views of the user interface.

DETAILED DESCRIPTION

Figure 1:
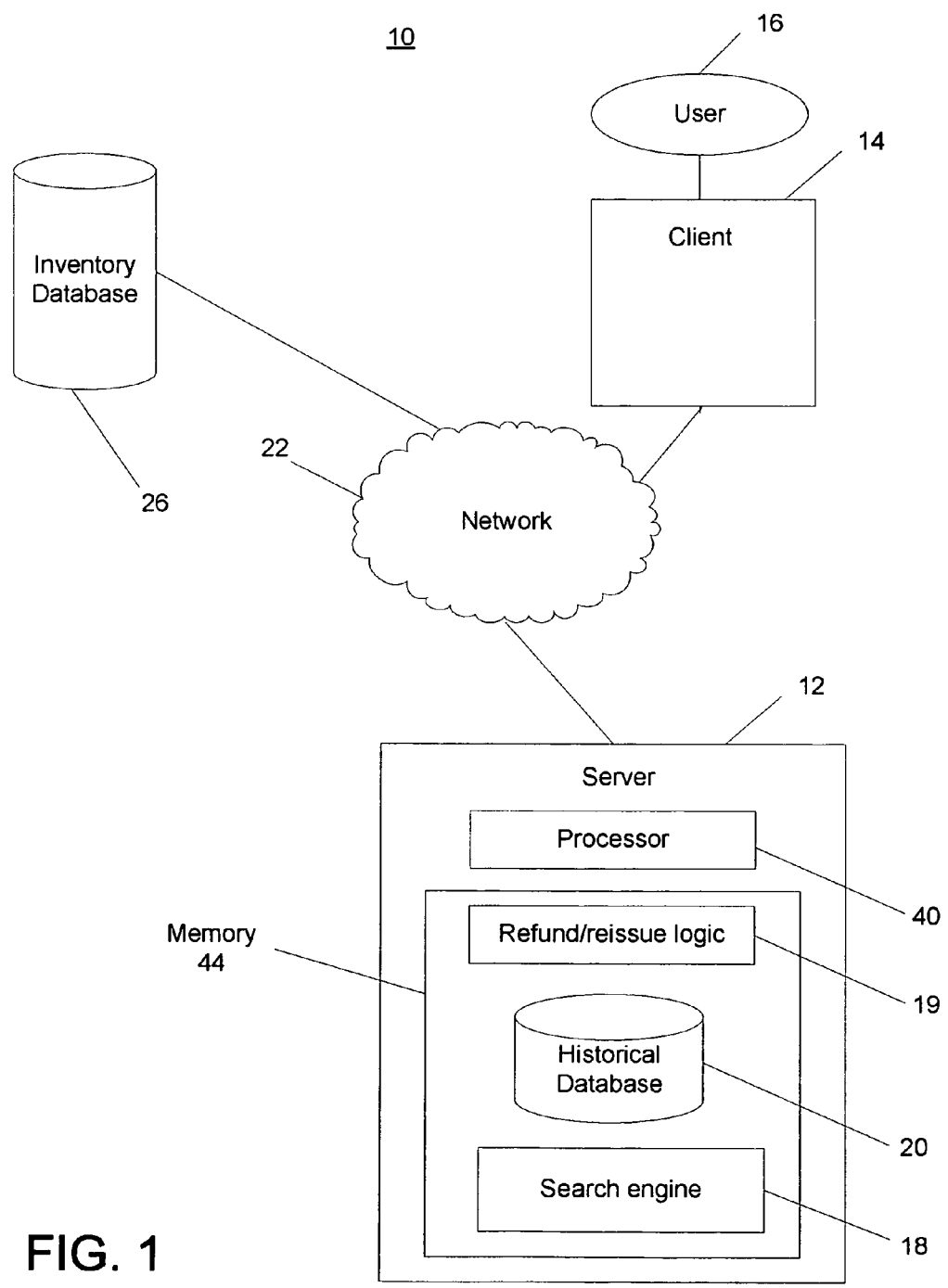
FIG. 1 is a block diagram of a travel planning system.

Referring to FIG. 1, a system 10 for travel planning, particularly adapted for reuse of issued tickets includes a client system 14 (or other system, e.g., terminal to input data) and a travel planning server 12 (server 12) coupled to the client system 14, via a network 22. The server 12 includes a search engine 18 that searches for pricing solutions in response to user queries, and also in conjunction with the refund/reissue logic 19, processes refund/reissue requests for users that hold issued tickets. Also included in the travel planning system 10 are a historical database 20 and an inventory database 26. While the travel planning system 10 can process conventional travel related queries from users, the travel planning system 10 also processes user requested refunds and/or reissued tickets.

The travel planning system 10 can be used with various forms of travel such as airline, bus and railroad and is particularly adapted for air travel. The travel planning system 10 may exist separately as a standalone system or may be implemented as an extension of an existing travel planning system capable of searching fares for future airline travel. An example of such an existing system is the travel planning system described in U.S. Pat. No. 6,295,521 filed by Carl G. deMarken et al on Jul. 2, 1998 and incorporated herein by reference, although other travel planning systems may be used in conjunction with the refund/reissue logic 19.

Details of refund/reissue logic 19 will now be described. A user (e.g., an individual consumer or a travel agent) at client 14 specifies one or more existing tickets to consider for reuse and parameters of a new trip in a query. The client 14 sends the query to the server 12 over network 22, which can be any local or wide area network or an arrangement such as the Internet. At the server 12, the search engine 18 and the refund/reissue logic 19 process the user's query to produce a complete set of pricing solutions for the new travel using aspects of the already issued ticket. In determining the pricing solutions, the refund/reissue logic 19 considers any rules associated with the existing ticket that specify conditions under which the existing ticket may be changed or exchanged. The rules are stored in the historical database 20. The historical database 20 is stored in the memory 42 of server 12. The historical database 20 may be built elsewhere from raw data files and distributed to the server 12 over the network 22. The client 14 receives the pricing solutions from the server 12 over the network 22 and presents the results to the user 16. The user 16 may sort the results by various criteria or extract a subset of results that fit the user's criteria. For example, the user may wish to view only the cheapest options, and of these, the user may wish to sort the results based on a time of day, carrier, length of travel, or other criteria. After the user selects one of the options presented by the client 14, the system books the new itinerary directly in a carrier's inventory system or in a computer reservation system (CRS) and reissues a ticket for the new travel.

The travel planning system 10 includes an historical database 20 that stores industry-standard information pertaining to travel (e.g., airline, bus, railroad, etc.). For example, the inventory database 20 can store the Airline Tariff Publishing Company database of published airline fares and their associated rules, routings and other provisions, the so-called ATPCO database. The system also includes an inventory database 26, which holds an inventory of current seat availability information for a particular carrier and so forth. The inventory and historical databases 26 and 20 may each actually be composed of several databases and may be stored locally within the server 12 or remotely on external servers connected to the network 22. In addition, the inventory database 26 and the historical database 20 may be managed together. The inventory database 26 includes inventory (i.e., seat availability) and uses a combination of live polling, caching, and availability prediction/computation.

Structure of an Airline Ticket

The system shown in FIG. 1 is described in the context of airline travel for determining pricing solutions for changes to an already issued airline ticket. In general, an airline ticket includes two parts. A first part is a reservation also referred to as a passenger name record (PNR), and a second is a ticket document, which can be either a physical or electronic document.

A PNR is an entry in one or more airlines' reservation databases that holds information such as the passengers' names, the flight segments of a trip, and which inventory ("booking code") has been reserved on each segment of the trip. A PNR may also include information, such as ticket numbers, frequent flyer numbers, etc. and be assigned a unique identification number or alphanumeric string called a "record locator."

A ticket document on the other hand, is a contractual document that entitles the holder to travel according to the PNR associated with the ticket. For example, a ticket document may show proof of a promise by the issuing agency to pay for the travel, or that the travel has already been paid for by the holder. A ticket document often contains a series of "coupons," each of which is good for travel on a single flight segment and information pertaining to how the travel was priced. After purchase, a ticket document may have an entry in the airline's electronic ticket database that contains a pointer to an active PNR in the reservation database, via the PNR's record locator. Typically, a PNR contains little or no information about the price of the travel or the method of payment. Although a ticket document and a reservation are often linked together, it is possible to have a reservation without a ticket document. For example, the ticketing process that issues the ticketing document can happen almost simultaneously with booking the reservation, or it may happen after a period of time (e.g., a week) has passed. It is also possible to have a ticket without a reservation. For example, if a ticketed passenger decides not to travel on a ticket that he has purchased, he will typically cancel the reservation but retain the ticket.

Both the reservation and the ticket may have useful value. A ticket generally has direct, e.g., monetary value, since it may be converted into cash or exchanged for another ticket. A reservation's value however is less direct. A reservation's value is related to the inventory that the reservation controls, e.g., in a booking code that is no longer available. The airline industry typically operates in a manner that canceling inventory does not imply that the canceled inventory may be rebooked immediately or at all, either by the current holder or another traveler. A reservation may also have value purely by virtue of the time it was produced, since many of the cheapest fares have requirements that the flights be reserved a certain period of time in advance of departure.

Server

Figure 2:
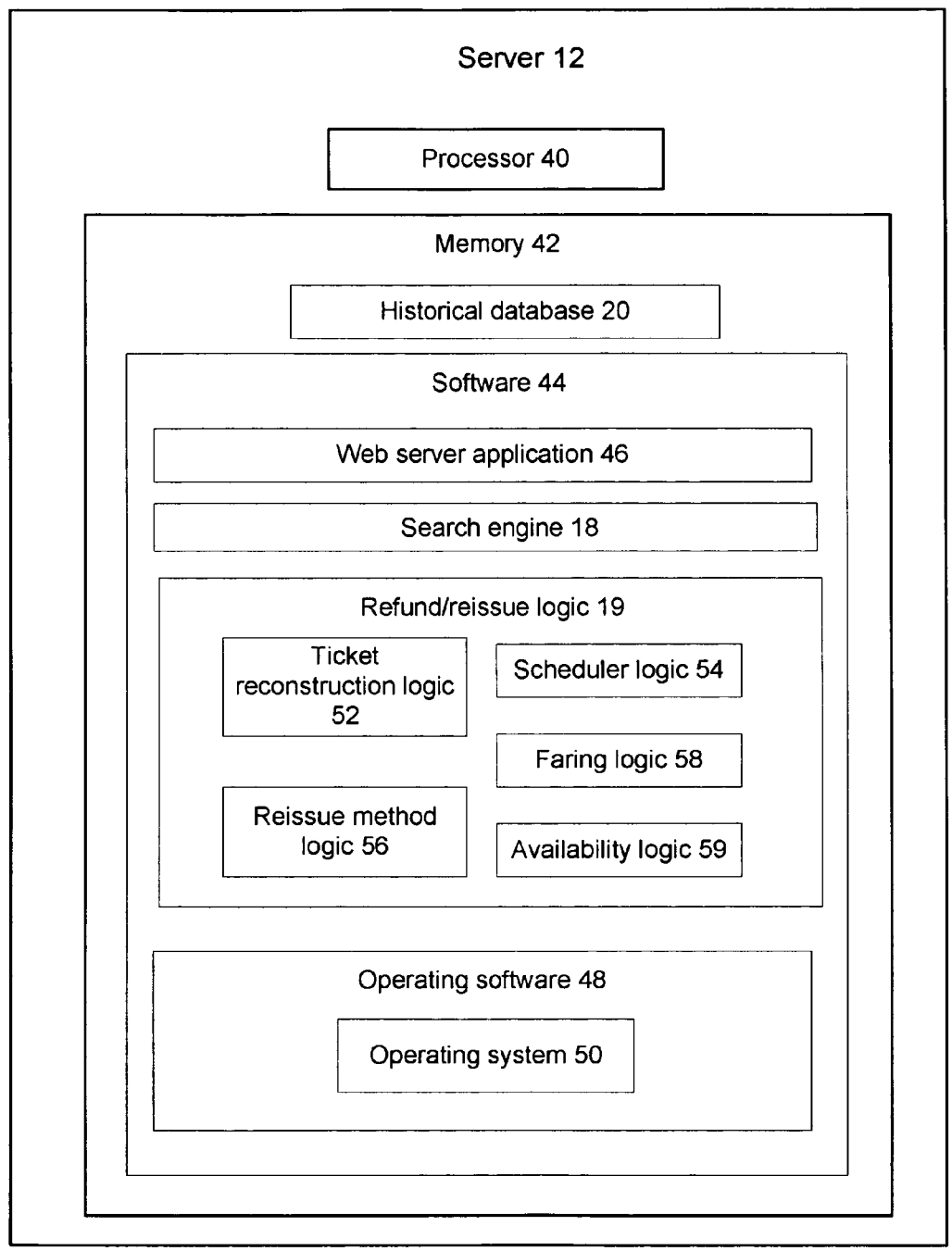
FIG. 2 is a block diagram of a server for use with the travel planning system of FIG. 1.

Referring to FIG. 2, the server 12 may be any type of computing device or multiple computing devices (e.g., a server farm). The server 12 includes a processor 40 and memory 42 that executes software 44. The server also includes a historical database 20 that is stored in memory 42. The software 44 includes the search engine 18, the refund/reissue logic 19, and a Web server application 46 for enabling communication with the client 14 The Web server application 46 includes one or more routines used in implementing the TCP/IP protocol, which allows the client computer 14 to communicate over the network 22. The server 12 also includes an operating system software environment 48 that includes, but that is not necessarily limited to, an operating system 50, such as Linux. The refund/reissue logic 19 includes ticket reconstruction logic 52, scheduler logic 54, reissue method logic 56, faring logic 58, and availability logic 59.

Using the information associated with the original ticket supplied in the query, the reconstruction logic 52 performs a historical pricing query, or other similar processing, using the historical database 20 to reconstruct the pricing solution that was used to issue the original ticket. The pricing solution, as reconstructed, includes fare rules associated with fares used in the original pricing solution. The fare rules determine the conditions under which the fares were applied to the original ticket and are used to determine whether those fare rules and fares can be used to provide a reissued ticket, and if so, under what conditions.

The scheduler logic 54 retrieves sets of flights that satisfy the request for new travel specified by the user's query. The flights may be retrieved from the database 26 of published flights or from other sources. The reissue method logic 56 determines whether the flights returned by the scheduler process may also satisfy the fare rules specified by the reconstructed pricing solutions. The availability logic 59 analyzes the flights returned from the scheduler logic 54 to determine whether there are seats available on the flights for the chosen fares (in the context of the existing reservation) and discards those combinations for which no seats are determined to be available. The faring logic 58 determines a set of valid fares, taxes, and surcharges for the remaining flights, following industry standard rules regarding currency conversions. In addition to pricing solutions for reissued tickets, the server 12 can be configured to produce other travel-related information as a result of a user query. For example, the server 12 can produce routes or airline suggestions, optimal travel times and suggestions for alternative requests.

Client

Figure 3:
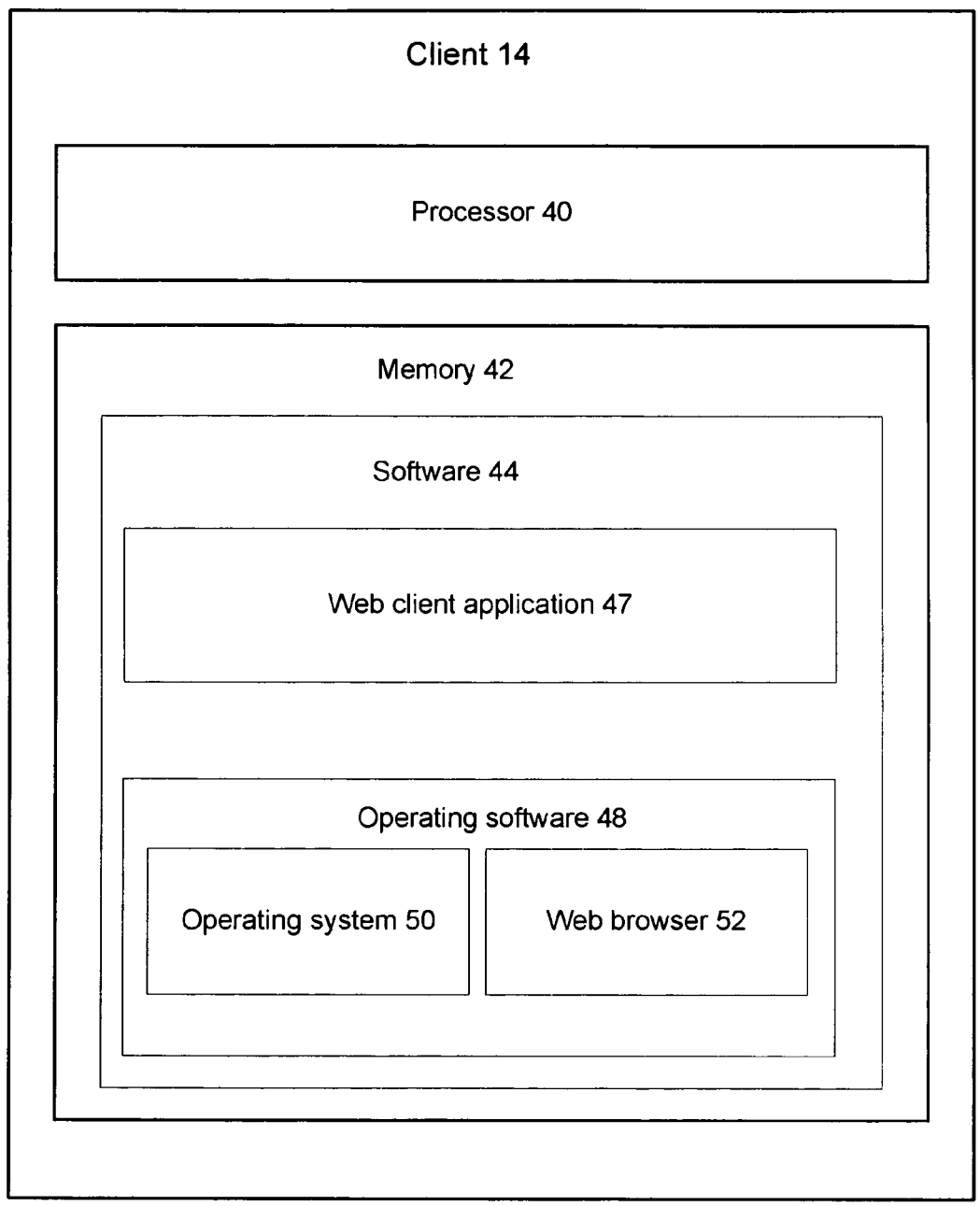
FIG. 3 is a block diagram of a client for use with the travel planning system of FIG. 1.

Referring to FIG. 3, a client computer 14 at which a user 16 enters a query specifying a change to a purchased ticket and receives pricing solutions for reissue tickets reflecting the change is shown. The query for a new trip includes information needed by the server 12 to determine a set of pricing solutions for reissuing or refunding an original ticket based on the new travel information and the original ticket. This new travel information typically requires at minimum, an origin and destination for the new travel and at least a portion of the information contained in the original ticket, to permit the process to reconstruct the original ticket. In addition, the information could also include times, dates, and so forth.

In some examples, the client computer 14 may be any type of web-enabled apparatus or system including but are not limited to a desktop computer, a laptop computer, a mainframe computer, a cellular telephone, a personal digital assistant ("PDA"), and a controller embedded in an otherwise non-computing device. The client computer 14 contains one or more processor(s) 40 (referred to simply as "processor 40") and memory 42 for storing software 44. The processor 40 executes software 44, which includes a Web client application 47 and operating software 48. The Web client application 47 includes one or more routines used in implementing the TCP/IP protocol, which allows the client computer 14 to communicate over the network 22. The operating software 48 includes an operating system 50, such as Windows XP®, and a web browser 52, such as Internet Explorer®. The web browser 52 enables the user 16 to interact with a web page (i.e., an electronic document) that serves as an interface between the user and the search engine 18. The web page provides the user 16 with an interface to enter queries for ticket changes and displays pricing solutions returned by search engine 18 in response to the user's queries. The web page may also provide the user 16 with tools for customizing the display of the returned results (e.g., sorting the results, extracting results of interest, and eliminating results that are not of interest).

Although loosely described as a client-server model the system 10 can be implemented in other configurations/architectures.

Historical Database

Figure 4A:
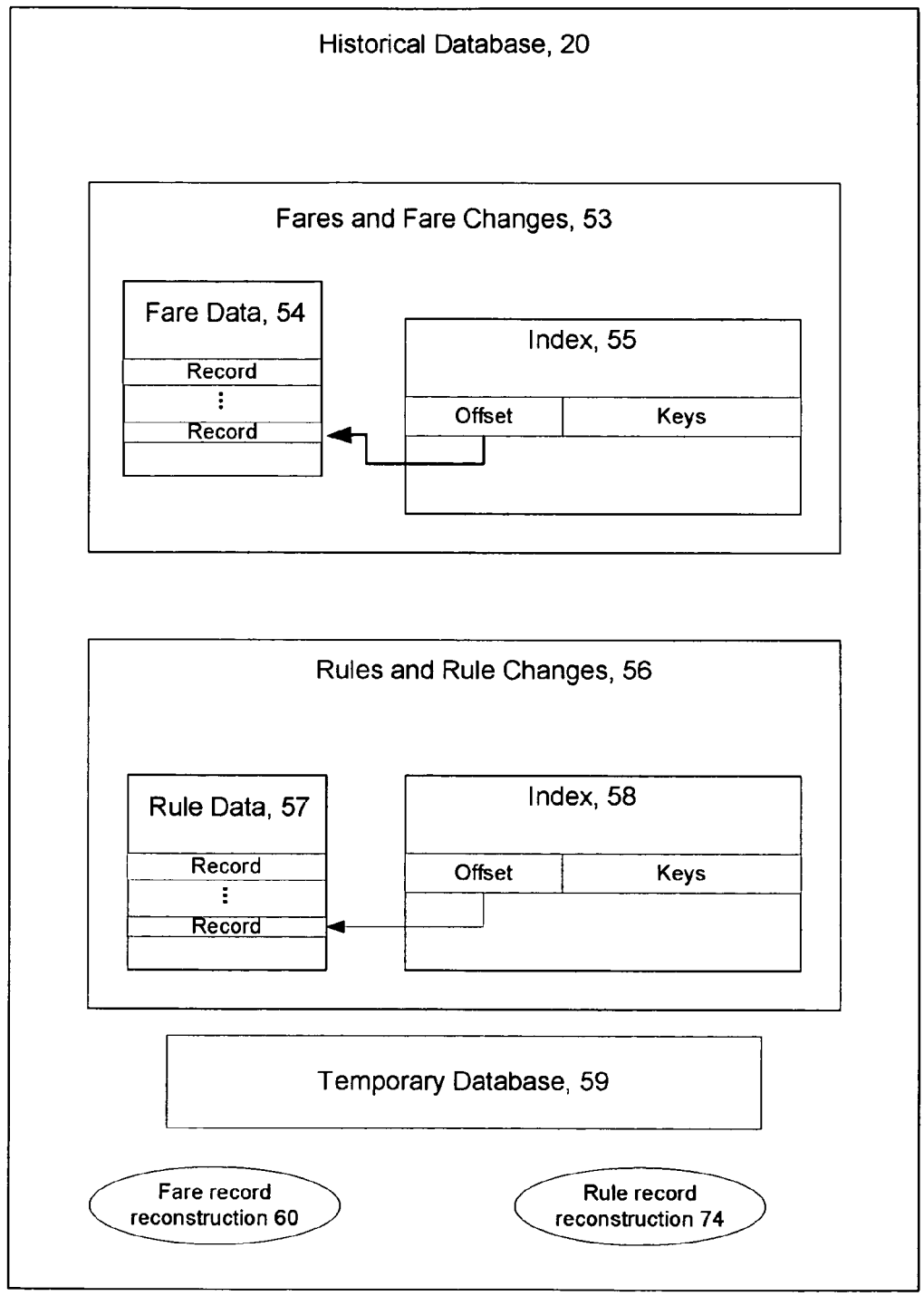
FIG. 4A is a block diagram of the historical database for use with the travel planning system of FIG. 1.

Referring to FIG. 4A, the historical database 20 is a database of historical information used with the refund/reissue logic 19 to decompose an original ticket into fares, fare rules and scheduling information that existed at the time that the ticket was issued. The historical database 20 includes fares and fare change information 53 and fare rules and rule change information 56. The fares and fare change information 53 includes an index 55 and a fare data file 54 that stores fare data provided by sources such as ATPCO and/or other sources. Similarly, the rules and rule changes information 56 includes an index 58 and a rule data file 57 that stores rule data provided by ATPCO and other sources. Fare and rule data files 54 and 57 hold the fare and rule data as records. The indexes 55 and 58 include keys that specify an airline, endpoint cities, or other travel parameters and file offsets paired to the keys. A file offset points to records of the fare data file 54 that correspond to the key paired with the file offset. A file offset corresponding to a group of records includes at least an address in memory where group of records start, and the number of records in the group. The file offset may also include the starting memory addresses of each record in the group. In addition to storing fares and fare rules data, the historical database 20 stores ancillary data, such as routings, fare construction tables, currency exchange rates, taxes, flights, and time zone variations. In some embodiments, the historical database 20 includes a third index for accessing the ancillary data e.g., routing, fare construction tables, currency exchange rates, taxes, flights, and time zone variations.

Fare records generally specify a fare for a given flight along with an effective date (i.e., the date on which the fare is in effect). Fare records may also specify changes or cancellations of a fare. When fare data changes, ATPCO sends either a fare record having a change tag that indicates that a new effective date of a particular fare or a fare record (referred to as a "cancel record") that cancels the fare. For each fare record that is received from ATPCO (or from another source), the historical database 20 stores the fare record in the fare data file 54 along with the date on which the fare record was transmitted. Rather than applying changes or canceling fares, as directed by ATPCO, the historical database 20 stores all of the received fare records and transmission times as the fare records arrive at the historical database 20.

At the time of query of the database 20 for historical records, a fare record reconstruction process 60 retrieves relevant fare records that existed before and during the time the original ticket was issued and stores those retrieved fare records in a temporary database 59. The historical database 20 merges the retrieved fare records stored in the temporary database 59 to provide the fare record that was valid when the original ticket was issued.

Rule records include an effective date on which a rule for a given fare is in effect. Rule records also include a discontinue date on which the rule is no longer valid. The discontinue date of some rule records may not be specified, indicating, in effect, that the rule record is valid indefinitely. When rule data changes, ATPCO sends a cancel record to cancel a rule or an update record to change the rule. In some embodiments, ATPCO sends update records having the discontinue date set before the effective date (i.e., effective tomorrow, discontinue tomorrow). In other embodiments, when ATPCO sends a change, they send a new rule record with an effective date that is the same as the transmission date. When the historical database 20 receives a new rule record, a rule record reconstruction process 74 changes the discontinue date on the previous record to the day before the effective date of the new record. For each rule record that is received from ATPCO or from another source, the historical database 20 stores the rule record in the rule data file 57 along with the date on which the rule record was transmitted.

At the time of query, the database 20 retrieves the rule records that existed during the time the original ticket was issued. The historical database 20 restores the rule record to its original form so that it appears the way it had looked when the original ticket was issued. For example, if the rule record had an indefinite discontinue date at the time the original ticket was issued, the historical database 20 restores the discontinue date of the rule record to be infinity, even though it may have a finite discontinue date specified at the time of query.

Figure 4B:
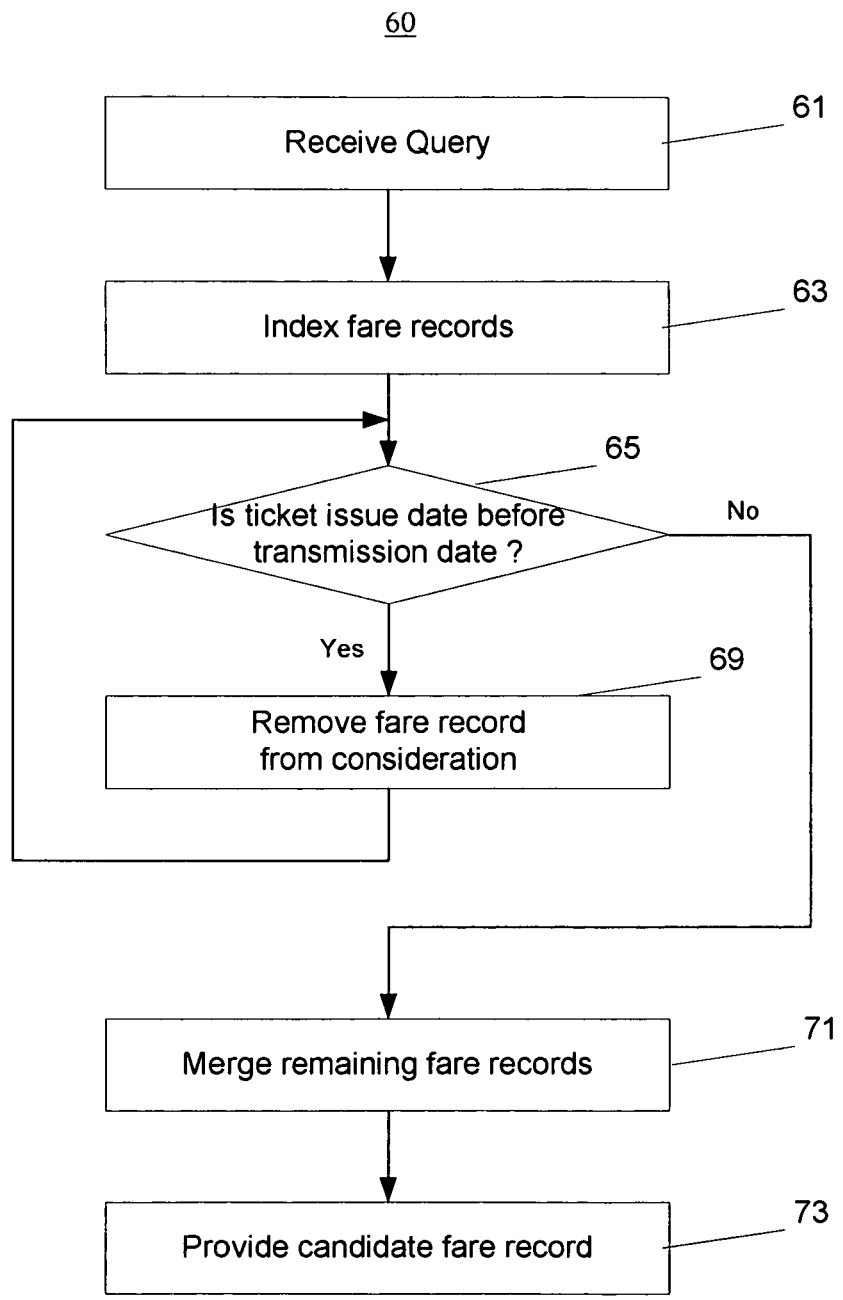
FIG. 4B is a flow chart showing a fare reconstruction process performed using the historical database of FIG. 4A.

Referring now to FIG. 4B, a fare record reconstruction process 60 receives a query (61) for historical records and determines an index (63) and retrieves relevant fare records that existed before and during the time the original ticket was issued. The historical database 20 searches through the records and determines (65) if the ticket was issued before the transmission date of the record and if so removes (69) the record from consideration. The fare record reconstruction process merges (71) the remaining retrieved fare records stored in the temporary database 59 to provide (73) a candidate fare record that was valid when the original ticket was issued. In some embodiments, the merging process 71 includes merging held inventory with live inventory.

Figure 4C:
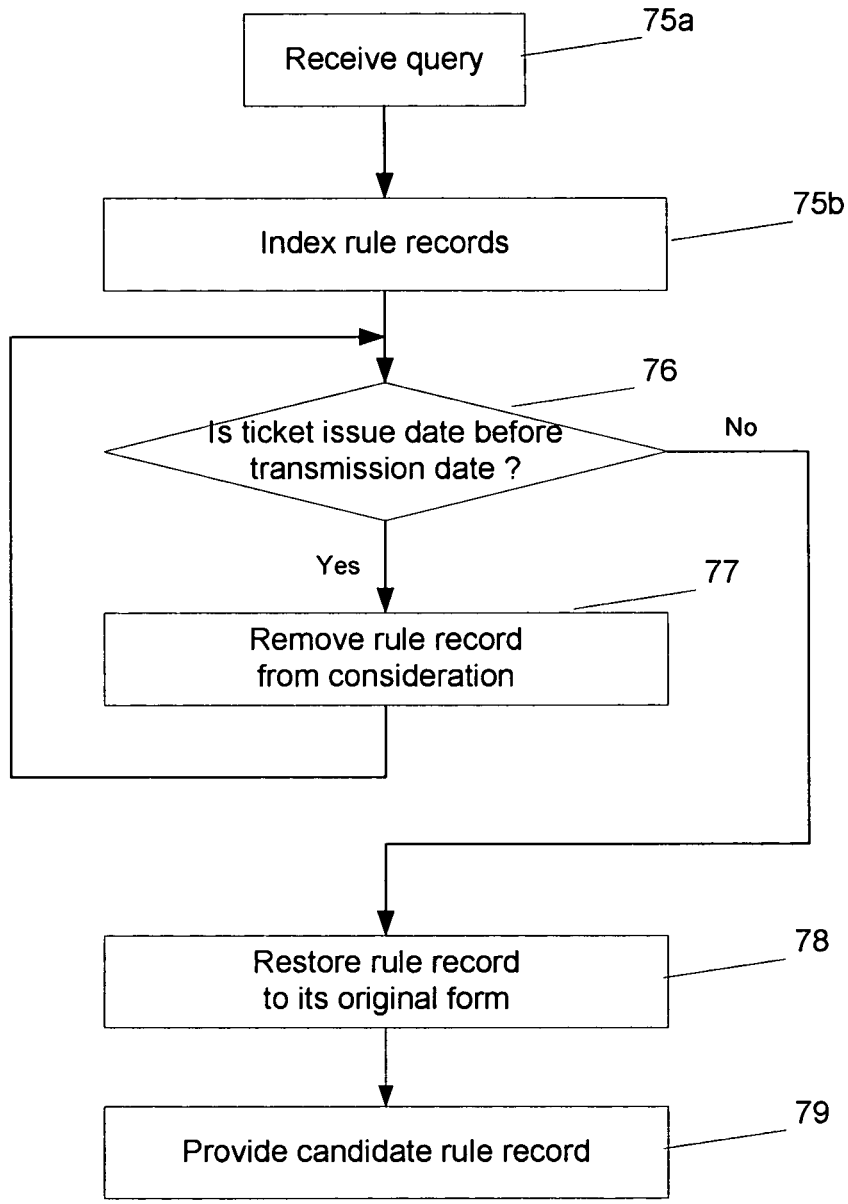
FIG. 4C is a flow chart showing a fare rule reconstruction process performed using the historical database of FIG. 4A.

Referring now to FIG. 4C, a rule record reconstruction process 74 receives (75*a*) a query for historical records and determines (75*b*) an index and retrieves relevant fare records that existed before and during the time the original ticket was issued. The historical database 20 searches through the records and determines (76) if the ticket was issued before the transmission date of the record and if so removes (77) the record from consideration. The rule record reconstruction process 74 restores (78) rule record to its original form to provide (79) a candidate rule record that was valid when the original ticket was issued. Unlike conventional schemes that store snapshots of fares and fare rules at different times in history, the historical database 20 stores a record of changes to the fares and fare rules that are used to reconstruct fares and fare rules on the fly at the time of query rather than at the time the fare and rule records are received.

Some data sources provide data to the historical database 20 that does not include explicit update or cancel records for canceling or changing previous data records. To handle data received from these types of sources, the historical database 20 or server 12 includes a program that looks at changes and computes incremental changes between records and stores these incremental changes. The program looks for any index that changed at all, determines the changes that were made, and stores the changes as additional records. For example, the program may insert a cancel record between two records where one would ordinarily be.

Under some frequently occurring circumstances, the exact time and date of ticket issuance and/or pricing is not known. To deal with such circumstances, the above algorithm is modified to take a time range instead of a single point in time. The result of the fare and rule retrieval processes are then sets of records, each labeled with a beginning and ending timestamp identifying the time period during which the record was valid.

Typically, tickets are only valid for one year from commencement of travel (which itself may be up to a year from the date of purchase) and this places a limit on how much historical data that needs to be maintained in the historical database 20. Even seemingly static databases, such as databases of city and airport codes, need to have historical versions to deal with the small number of changes that occur to them over the course of a year. Data is stored in the historical database 20 for a limited period of time (e.g., 25 months), after which it is purged to make room for new data.

To improve speed of data retrieval, the historical database 20 is implemented as a memory mapped file system that can be directly accessed from memory 42 by the processor 40. Although the historical database 20 could also be implemented as a relational database, in some implementations a memory mapped implementation is preferred. In some embodiments, the historical database 20 includes two separate indexes to the same fare and rule data: a first index referencing only to current data and a second index referencing both current and historical data. Having two such indexes can be used to speed up access to current data. The historical database 20 may also store information in a data file as the information arrives from ATPCO or other data sources and use the information to reconstruct the original ticket at the time of query.

Server Process

Figure 5:
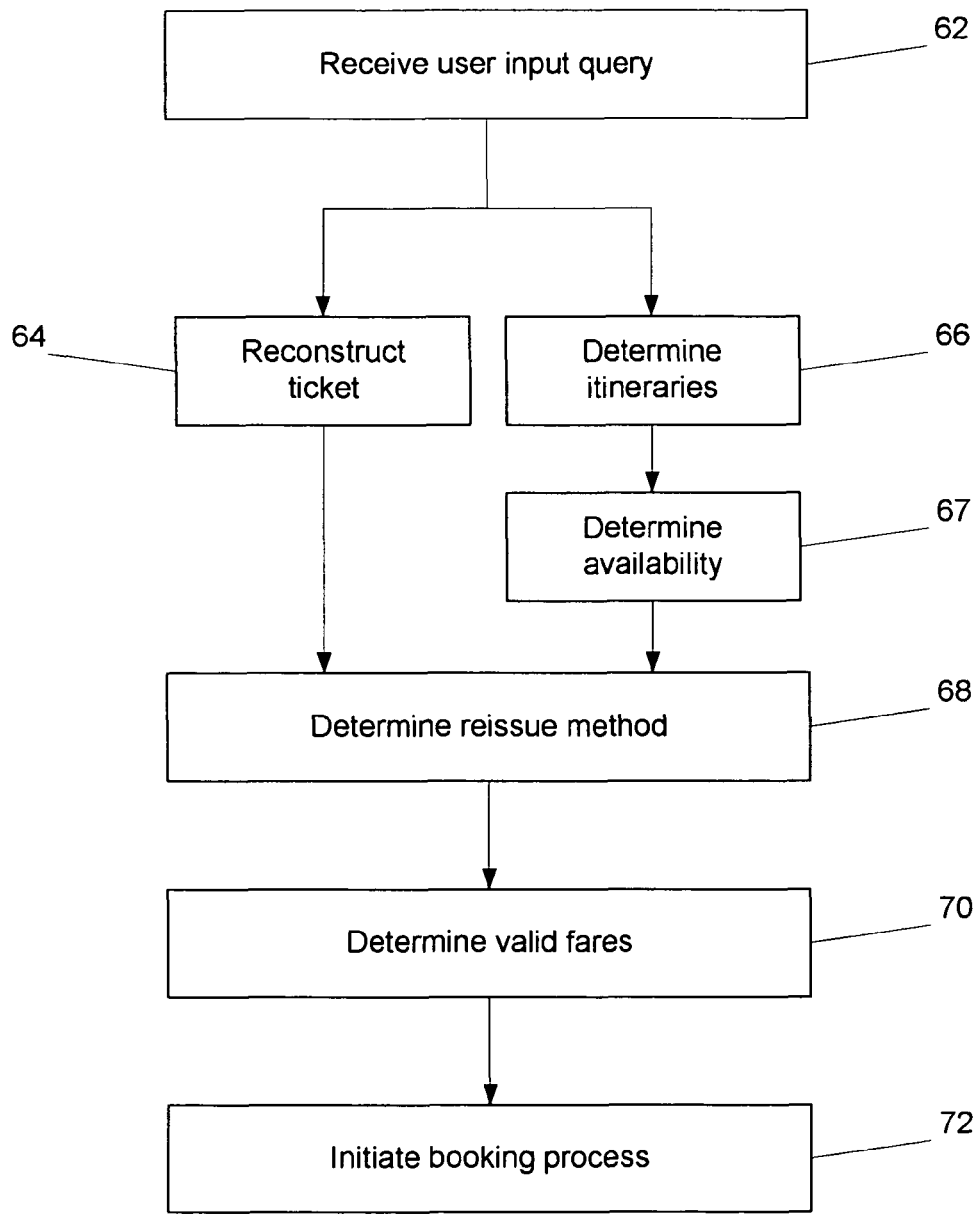
FIG. 5 is a flow chart showing a server process performed by the server of FIG. 2.

Referring now to FIG. 5, refund/reissue logic 19 for providing new pricing solutions to satisfy changes to a purchased ticket is shown. The refund/reissue logic 19 is preferably executed on the server computer 12, but could be executed on the client computer 14. The refund/reissue logic 19 receives (62) a query from the user 16. The query includes information needed by the server 12 to determine a set of pricing solutions for issuing a new ticket that satisfies the requested new travel requirements using some value associated with an original, issued ticket. This information typically requires at minimum, an origin and destination for the new travel and at least a portion of the information contained in the original ticket and/or PNR. The query may specify other information related to the original ticket, for example, flight segments that have already been flown, information about taxes paid, etc.

The refund/reissue logic 19 reconstructs (64) the ticket based on the received query in reconstruction logic 52 (FIG. 2). The reconstruction logic 52 queries (not shown) the historical database 20 using information associated with the original ticket supplied in the query. The historical database 20 returns one or more possible sets of fares and rules, referred to as "candidate fares and rules," whose associated records contain information that matches the information associated with the original ticket. The reconstruction logic 52 may narrow down the returned pricing solutions by evaluating the rules associated with the fares in the context of the original ticket. The result is a set of "candidate reconstructed tickets."

The refund/reissue logic 19 determines (66) possible itineraries, that is, sequences of flight segments, between the origin and destination for each portion of a new trip, which can satisfy the new travel requirements specified in the query. The scheduling uses the scheduler logic 54 (FIG. 2) in combination with the search engine 18 (FIG. 2) to produce a large number of such itineraries. Examples of scheduler systems to provide itineraries to the scheduler logic 54 that may be used include the scheduling component of the QPX search engine, or also equivalently other products such as OAG Flight Desk (Official Airlines Guide, a division of Reed Travel Group) or schedule components of computer reservation systems (CRS's) such as Sabre®, Apollo®, Amadeus® and WorldSpan®. In some embodiments, the scheduler logic 54 is configured to obtain the largest number of possible itineraries. The availability logic 59 (FIG. 2) analyzes the pricing solutions returned from the scheduler logic 54 to determine (67) whether there are seats available on flights of the itineraries. The availability determination (67) eliminates those itineraries for which there are no seats available. The candidate solutions determined (64) using the reconstruction logic 52 and the itineraries for replacement tickets returned from the availability logic 59 are fed to the reissue method logic 56.

The reissue method logic 56 (FIG. 2) determines (68) for each candidate reconstructed ticket which, if any, valid reissue methods may be used to refund or exchange it with one or more of the proposed replacement itineraries returned from the scheduler logic 54. A reissue method specifies a type of change that may be made to a ticket and the conditions under which the change is made. Reissue methods may also include canceling and refunding at least a portion of an original ticket. For example, a reissue method for canceling a ticket and receiving a full refund may require the ticket holder to cancel the ticket at least two weeks before the scheduled departure. The reissue method logic 56 may eliminate candidate reconstructed tickets for which no reissue methods exist and reissue methods that are not applicable to any combination of candidate reconstructed tickets and replacement itineraries. After evaluating reissue methods in the context of the candidate reconstructed tickets and the replacement itineraries, the reissue method logic 48 returns the reissue methods that allow one or more of the candidate reconstructed tickets to be replaced by one or more of the proposed itineraries.

The reissue method logic 56 provides reissue methods and sets of candidate reconstructed tickets and reissue itineraries that are applicable to each of the reissue methods to the faring logic 58. The faring logic 58 determines (70) valid fares corresponding to the replacement itineraries produced by the itinerary determination process 66 (also referred to as scheduler process 66) according to the reissue methods that are valid for the replacement itineraries. In determining (70) valid fares, the faring logic 58 calculates the final prices of the reissue solutions that may include taking deductions based on the existing ticket (fare or tax amounts paid) and adding penalty amounts specified by the reissue methods. The refund/reissue logic 19 on the server 12 sends the reissue pricing solutions to the client 14. After receiving a user's selection of one of the pricing solutions from the client 14, the server 12 initiates (72) a booking process to provide a booking and reservation for the user 16 based on the selected pricing solution. The booking process (72) is optional and may be performed by an external booking system.

Ticket Reconstruction Process

Figure 6:
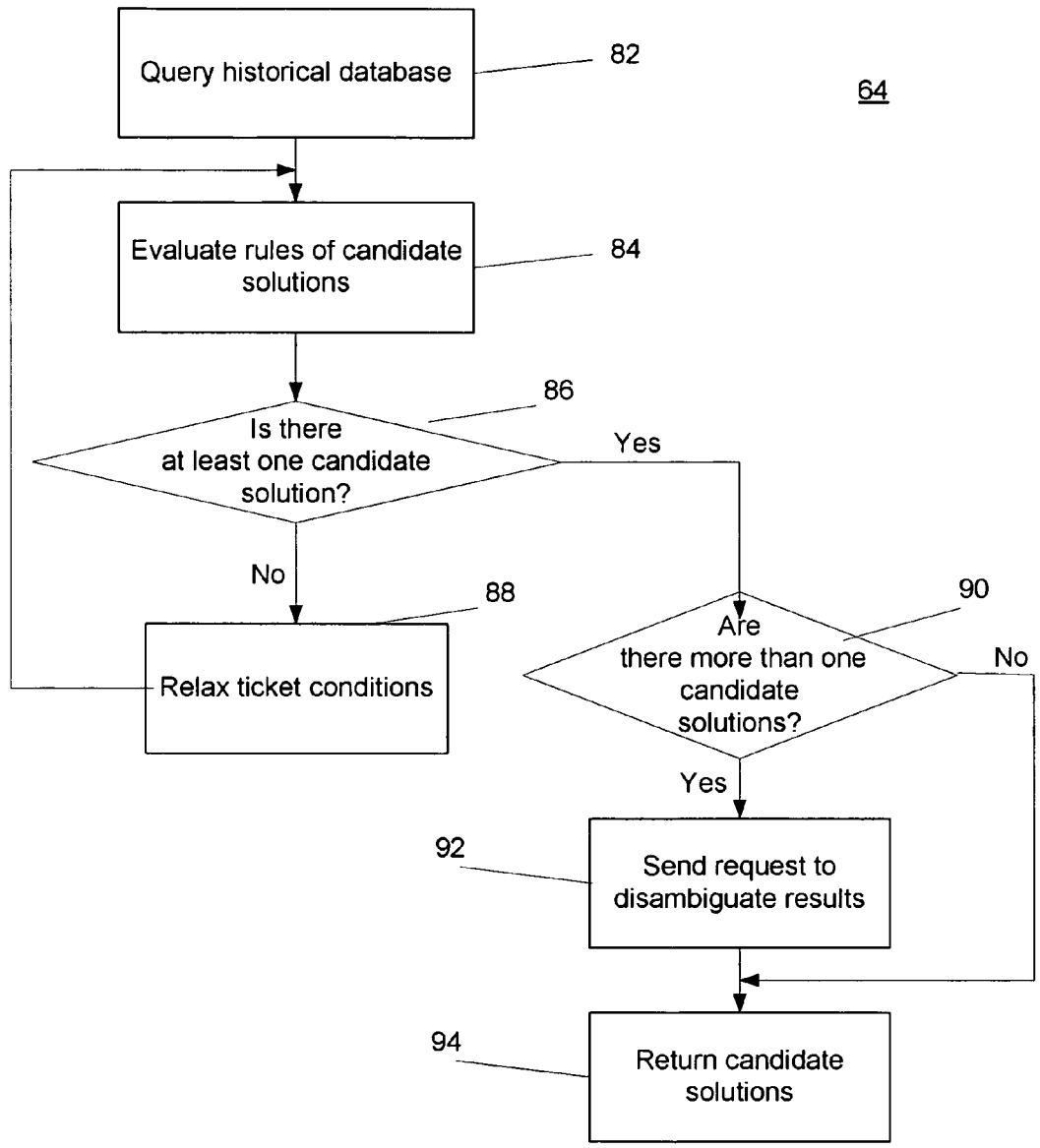
FIG. 6 is a flow chart showing the ticket reconstruction process of FIG. 5 in further detail.

Referring to FIG. 6, the ticket reconstruction process 64 (FIG. 5) performed by the ticket reconstruction logic 52 is shown in further detail. The information that can be supplied about a ticket and reservation (such as what is written on the paper version of a ticket, what is contained in the airline ticketing database, or what is contained in the PNR) is not necessarily sufficient to unambiguously determine how the ticket was originally priced. Furthermore, even if the fares themselves are determined unambiguously, the rules for reissue and exchange of tickets may require information that is not contained on the ticket, such as the structure of the "priceable units" contained on the ticket. The ticket reconstruction logic 52 queries (82) the historical database 20 using information pertaining to the original ticket, including information on the ticket and from a PNR, provided in the user's query.

The historical database 20 returns the fare records having information that matches the information supplied in the query. In some embodiments, the fare records in the historical 20 database contain information fields including: a carrier, a city pair, a fare basis code (an alphanumeric identifier), a tariff number, a rule number, a fare tag (one-way, round-trip, or one-way-only), the price for the particular fare record, and dates, such as the transmission date of the record and validity date or dates of the record. Typically, the user's ticket includes only a subset of the fields for each of the fares that it covers. For example, the fare information contained on the ticket may be limited to the following fields: the carrier, cities, fare basis code, price, and issue date. Because fare records may differ by any of the database information fields, there may be multiple entries in the database that match fields listed on the ticket; each is a potential match for the fare listed on the ticket.

In some instances, the data in the fields listed on the ticket may be incorrect or unreliable. Examples of such instances include the following: the fare rules may specify modifications to how the fare basis code is printed on the ticket; the price listed on the ticket is not the price in the fare record, but rather it is the sum of the fare record price with some applicable surcharges for the fare; the issue date of the ticket may not be the date when the ticket was priced; and the fares used on the ticket may originate from an unknown date if the ticket has been reissued previously.

The historical database 20 also includes fares that are constructed through various processes, including: processes that produce constructed fares (e.g., international fares which are pieced together from a "published base fare" and one or two "arbitraries or add-ons"), and processes that produce a "fare by rule fares" (e.g., fares that are produced from other fares or for all markets in a geographic area). Thus, it is important that the correct fare records are retrieved from the historical database 20, since the methods available for changing a ticket depend on the rules attached to the fares on the ticket.

After a set of candidate fare records are returned by the historical database 20 in response to querying the historical database (82), the reconstruction logic 52 optionally evaluates (84) the rules of the candidate fare records in the context of information in the original ticket. In one implementation of the reconstruction logic 52, it is assumed that the system that priced the original ticket evaluated fare rules associated with the fare used to price the original ticket. The reconstruction logic 52 can dismiss, as candidate matches, any fare whose rules "FAIL" when the rules are applied to the flights of the original ticket, because the original pricing system would not have used those fares whose rules had failed. For example, the reconstruction logic 52 checks whether any special conditions specified in the candidate fare records such as day of week, seasonality, Saturday night stay, advance purchase, etc. are satisfied by the original ticket. Upon determining that one or more rules of a candidate fare record are violated, the reconstruction logic 52 eliminates the candidate fare record from consideration. In addition to rules which apply to the flights on the tickets, fares may also fail combinability constraints with each other.

The ticket reconstruction process 64 (FIG. 6) determines (86) if at least one candidate solution has been returned by the rule evaluating process 64. If no solutions are found, the ticket reconstruction process 64 progressively relaxes (88) or waives certain rules and re-evaluates (84) the candidate solutions until at least one candidate solution passes the evaluation. For example, it is possible that the reconstruction process 64 will fail to produce any valid tickets composed of the candidate fare records. This can happen for a variety of reasons, including: (1) data in one or more fields listed on the ticket being incorrect or unreliable, (2) the ticket was issued by an authority that had access to fares that are not stored in the historical database 20, (3) one or more fare rules were overridden to produce the original ticket, and (4) ancillary data used by the pricing system that issued the original ticket (e.g. exchange rates, international taxes, etc.) does not match the ancillary data of fare records stored in the historical database 20. In some embodiments, the reconstruction logic assigns a penalty value for each violated rule, and for each fare record that violates a rule, the reconstruction logic 52 sums the penalty values associated with rules violated by the fare record. The reconstruction logic 52 can then determine which of the fare records violated the least number of rules or pose the least serious kinds of violations by determining those fare records having the lowest sum of penalty values.

Alternatively, all combinations of fares and flights can be simultaneously considered, and a configurable penalty assessed for each rule violation; the pricing solution with the lowest penalty can then be chosen.

In some embodiments, the reconstruction logic 52 (FIG. 2) collects information used to eliminate the candidate solutions, including rules themselves that were violated, and returns the collected information to the user 16 or to an administrator in a report. The user or administrator may analyze the report to make an informed decision about the correct course of action regarding the violated rules. For example, the user 16 or the administrator might instruct the ticket reconstruction logic 52 (FIG. 2) to waive certain conditions or force a manual pricing of one or more candidate solutions that had been eliminated.

If at least one candidate solution exists, the process (64 of FIG. 6) determines (90), if multiple candidate solutions exist. This may occur if insufficient information has been provided (for instance, the identification of the agency that issued the original ticket, or the exact time that the previous price was computed may be unknown), or it may occur if there were actually multiple valid candidate solutions corresponding to the original ticket. A source of ambiguity that may lead to multiple valid candidate solutions is the "priceable unit" structure of the final answer. The airline industry enforces certain constraints on a ticket pricing structure by grouping fares on a ticket into "priceable units" and enforces rules within the context of these priceable units. It is common for multiple different priceable-unit structures to result in tickets that are otherwise identical, including final price. If the priceable unit information is not supplied in the query, the process 64 of reconstructing the ticket may result in an un-resolvable ambiguity of seemingly valid multiple candidate solutions. The presence of multiple candidate solutions matter to the extent that the multiple candidate solutions influence options available for changing the ticket.

If only one candidate solution exists, the reconstruction logic 52 returns (94) that solution to the scheduler process 66 (FIG. 4). If, however, multiple candidate solutions exist, the reconstruction logic 52 sends (92) a request to the user 16 or possibly to an administrator to disambiguate the results. After the results are disambiguated, the process returns (94) one or more candidate solutions selected by the user 16. In some embodiments, the reconstruction logic 52 may attempt to disambiguate multiple results by determining if there is only one candidate solution whose total price of the results that matches the total price of the existing ticket, and selecting that candidate solution. In other embodiments, the process 60 simply returns (94) all of the candidate solutions remaining after the rules evaluation procedure (84) without sending a request to the user 16 to disambiguate the results (92). All of these candidate solutions would then be carried forward into the reissue process equally, and the most advantageous candidate chosen for each possible reissue pricing solution.

Scheduler Process

Figure 7:
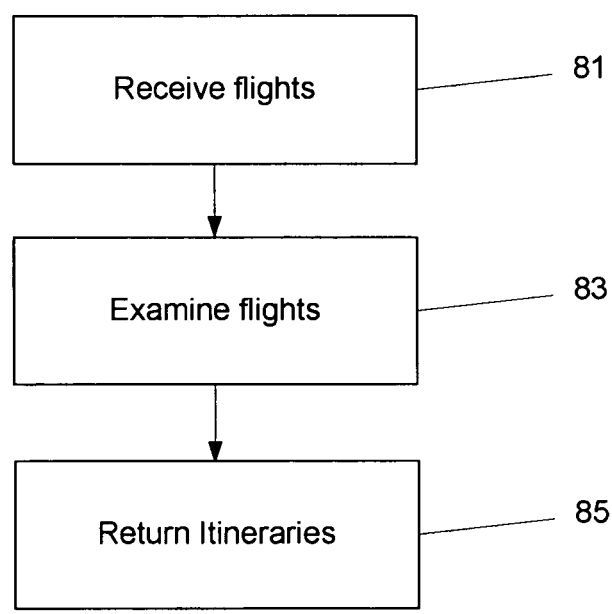
FIG. 7 is a flow chart showing the itinerary determination process of FIG. 5 in further detail.

Referring to FIG. 7, the scheduling process 66 (FIG. 5) (also referred to as itinerary determining process 66) by which the scheduler logic 54 identifies possible flight schedules that satisfy the new travel request is described in further detail. In a situation where new tickets would otherwise be very expensive, it may be very advantageous to make use of as much of the existing ticket as possible. Thus, when producing a list of possible replacement itineraries, the scheduler logic 54 receives (81) from the search engine 18 sets of flights that satisfy the request for new travel specified by the user's query, examines (83) the flights on the original ticket and returns (85) the itineraries for a replacement ticket that include one or more of the original flights, even if the flights might not normally be considered by a regular travel planning system (e.g., because the flights are deemed too circuitous). For example, if the passenger is holding tickets for a round-trip, e.g., from Boston to Miami via Atlanta, but now wishes to make a last minute change to go to, e.g., Seattle instead of Atlanta, there may be great value (in terms of lower cost or even priority in securing seats) in considering trips that go through Atlanta (or even Miami) to get to Seattle, though such itineraries may be less time efficient.

Availability Process

Figure 8:
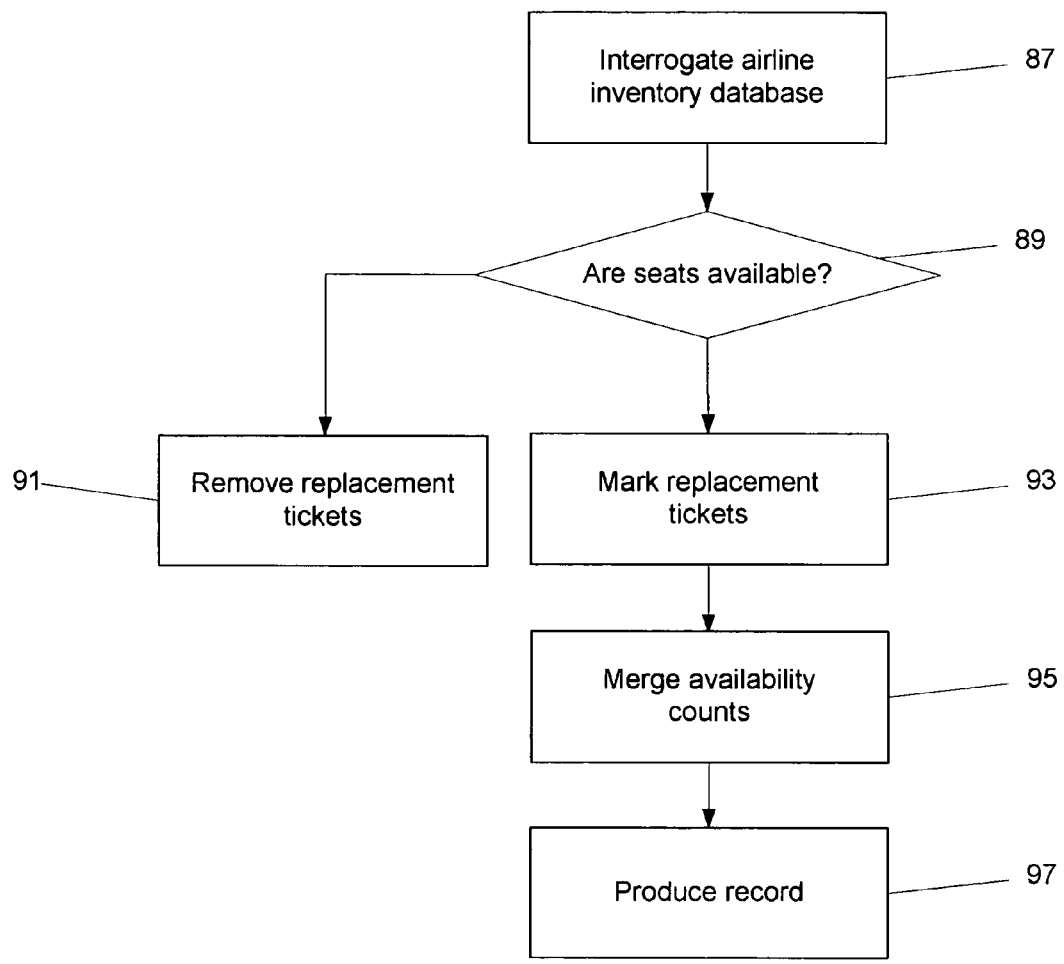
FIG. 8 is a flow chart showing the availability determination process of FIG. 5 in further detail.

Referring to FIG. 8, the availability determination process 67 (FIG. 5) by which the availability logic 59 determines whether the replacement itineraries returned by the scheduler logic 66 are available is described in further detail. The availability logic 59 interrogates (87) the inventory database 26 to determine (89) whether there are seats and fares available on particular flights for the replacement tickets and removes (91) from the set of replacement itineraries those itineraries for which there are no seats or fares available. While the refund/reissue logic uses the information contained on the ticket, even if no seats or fares are currently available in the inventory category held by the user 16, the availability logic 59 allows the user 16 to retain those seats and fares, subject to airline rules.

Contained within some PNRs are a set of "married segment indicators." Married segment indicators used by the airline industry are integers associated with flight segments that indicate which flight segments of the inventory held in the PNR are to be considered together as distinct units. If one segment with a particular married segment indicator is canceled, then all segments with that indicator must be canceled. This prevents changes to the PNR that allow the passenger to retain some of the married segments while canceling others. Generally, segments are married within a PNR to indicate that the inventory was granted to a passenger on the assumption that they would travel on (and pay for) all of the segments. For example, a passenger may have bought a ticket from Boston to LA connecting in Dallas. If the two segments are married, the passenger cannot keep the Boston to Dallas segment and cancel the Dallas to LA segment.

In determining availability of flights on the replacement tickets returned from the scheduler logic 54, the availability logic 59 marks (93) the replacement itineraries with potential marriage indicators (discussed below). For sequences of flights that overlap partially with the inventory currently held in a PNR, the availability logic 59 merges (95) availability counts from these sequences of flights with the inventory from the PNR, in accordance with the marriage indicators. For each response to an availability query for an overlapping sequence of flights, if the response contains a marriage indicator for the same subsequence as a married subsequence currently held in the PNR, the availability logic 59 produces (97) a record associated with the response that includes the counts for the subsequence of flights replaced with a placeholder record representing that married sequence from the PNR, with only currently held inventory available. The counts used in these placeholder records are given by the number of passengers in the existing PNR. The PNR holds inventory for the passenger; the reissue is accomplished by editing the PNR. The passenger is allowed to keep inventory they have from the original booking, or use new inventory available now. Pseudo code for the availability determination process 67 is:

```
Save away the currently held inventory.
Perform a live availability query for current availability
for each itinerary
    let P[length[itinerary]] = { { } }
    for f from length[query]–1 downto 0
        IF (flight in itin at f matches a flight on the ticket)
            AND (flight on ticket is the start of a married group)
        THEN
            let ticket-av = list of booking-codes used on this
                            married group on the ticket
            let l = length of married group
            for each R in P[f + l]
                P[f] = P[f] union (ticket-av + R)
        ENDIF
        for each availability answer for itinerary
            IF (flight in itin at f is start of a married group in
                answer)
            THEN
                let answer-av = list of flight availabilities for
                                this married group
                let l = length of married group
                for each R in P[f + l]
                    P[f] = P[f] union (answer-av + R)
            ENDIF
        add the new answers in P[0] to the set of answers for this
            itin
```

Although the availability determination process 67 is shown after the scheduling process 66 in FIG. 5, the availability determination process 67 could be included as part of the faring process 70 (or at other points in the processing) to eliminate pricing solutions for which no seats are available for one or more flights.

Reissue Method Process

Figure 9A:
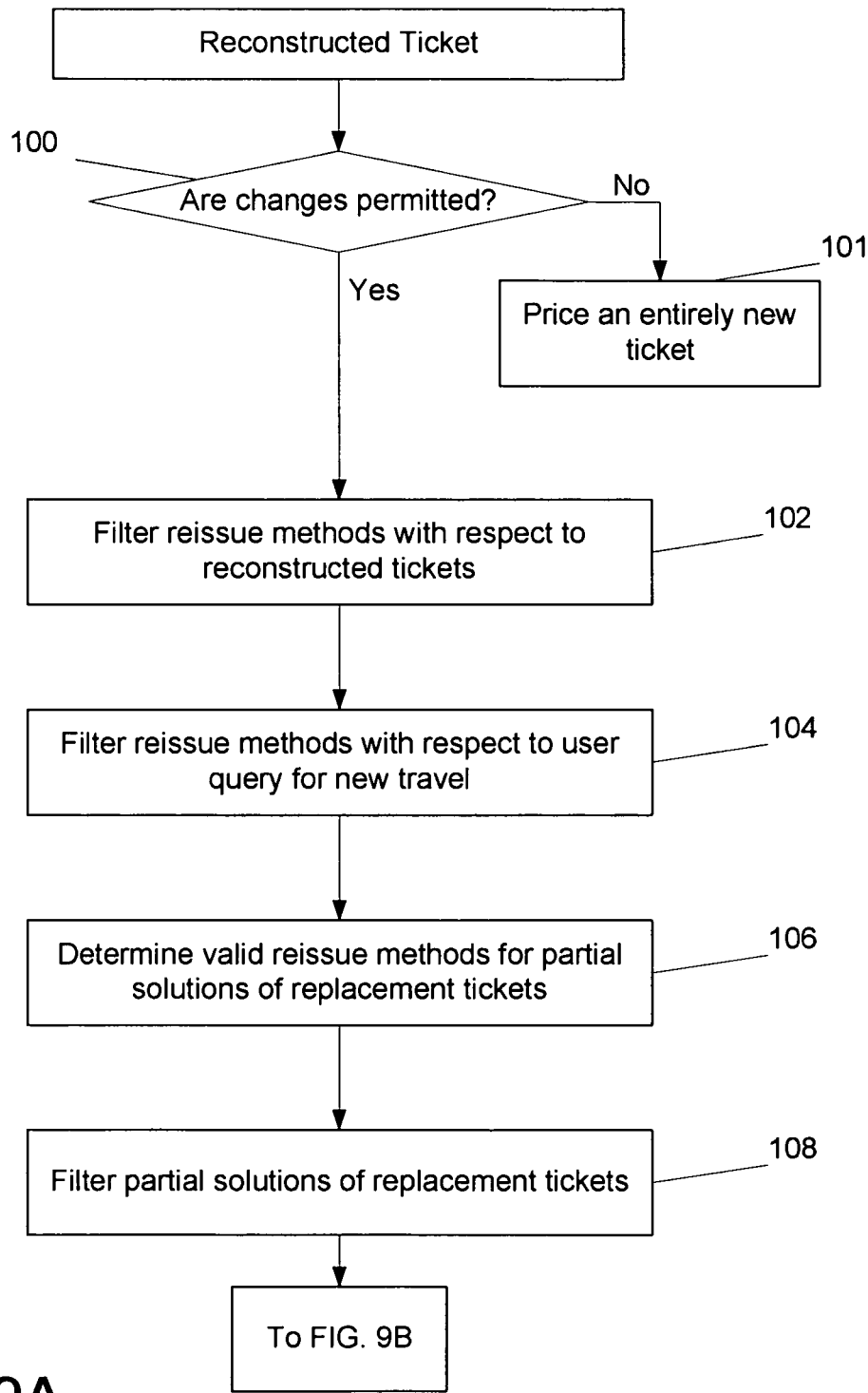
FIGS. 9A-9B collectively show a flow chart of the reissue method determination process of FIG. 5 in further detail.
Figure 9B:
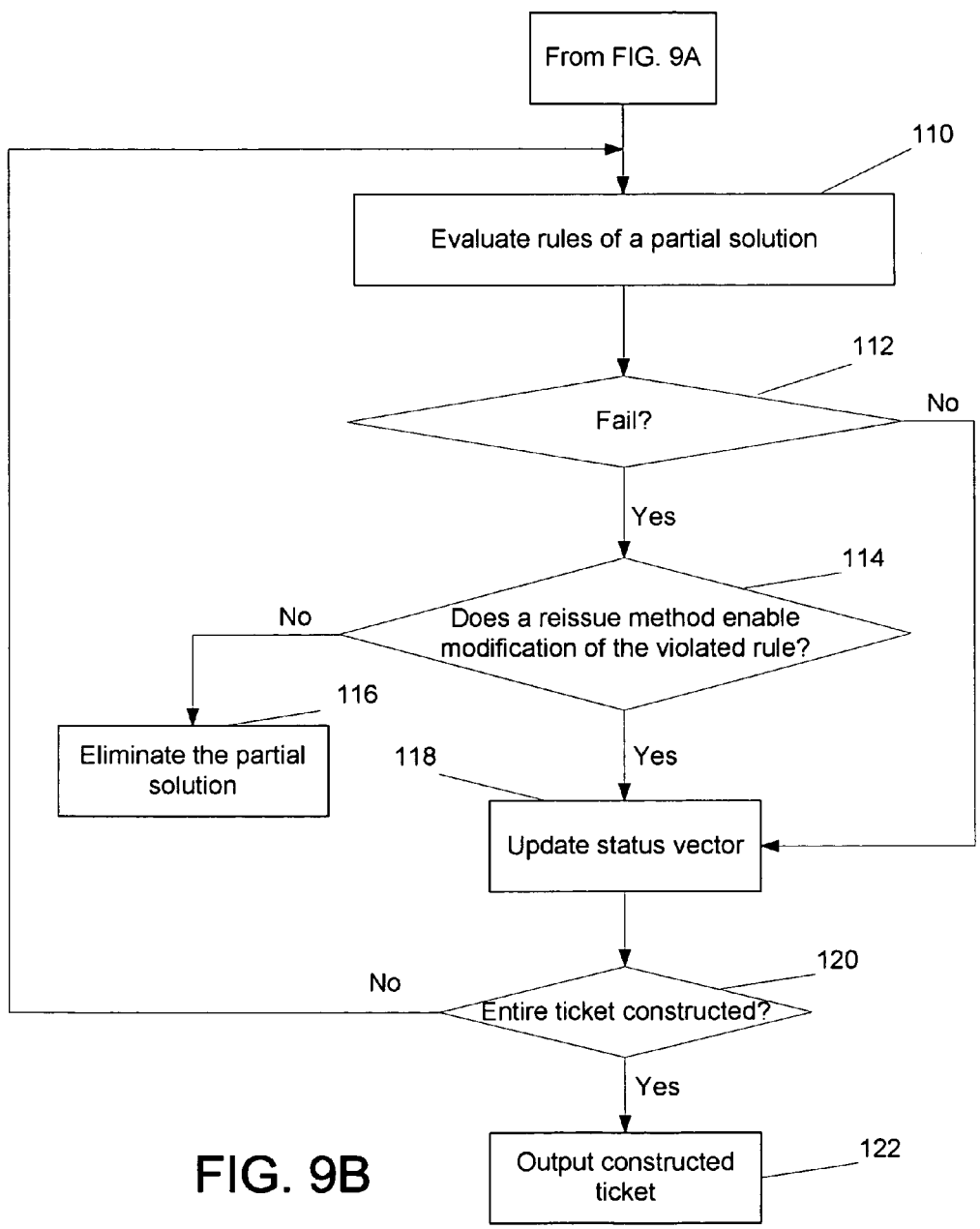

Referring to FIGS. 9A-9B the reissue method determination process 68 (FIG. 5) performed by the reissue method logic 56 is shown in further detail. Given a reconstructed ticket, the reissue method logic 56 determines what options are available for refunding and/or exchanging the ticket. For a given ticket, one or more different types of change mechanisms, referred to as "reissue methods", may be allowed. Some reissue methods issue a new ticket to replace an existing ticket while other reissue methods involve canceling the ticket and providing the holder a refund, and then buying a new ticket (not technically a ticket reissue). A reissue method specifies a type of change to an issued ticket and conditions under which that change may be made.

A reissue method includes one or more of the following components:

(1) conditions on the original ticket (e.g., partially flown vs. completely unflown, ticket still valid for travel or not, exchange before or after departure, current time within the original "ticketing time limit", passenger type at time of original ticket purchase, whether the ticket has previously been reissued or not, etc.);

(2) a source for fares used for re-pricing (e.g., keep all fares on original ticket, keep fares for unchanged flights, current fares for changed flights, historical fares from the time of ticket issue for all flights, and many other combinations);

(3) rule waivers for re-application of ticketed fares to new flights;

(4) mechanisms for validating advance purchase restrictions;

(5) conditions on the new ticket (e.g., must not change the first fare component, must not change fare breakpoints, specific restrictions on what fares may be used, the ticket must cost more than the previous ticket);

(6) change penalty amounts;

(7) changes in a form of payment or refund to be applied to the reissued ticket (e.g., cash refund, a refund in the form of credits that can be applied toward the purchase of a future ticket).

Given a reconstructed ticket, the reissue method logic 56 determines (100 of FIG. 9A) whether changes can be made to the reconstructed ticket. To accomplish this determination, in some embodiments, the reissue method logic 56 examines the validating (ticketing) carrier of the reconstructed ticket, the carrier or agency performing the new transaction, the proposed new validating carrier, and the group of carriers whose fares and flights appear on the ticket. Based on this information, the reissue method logic 56 determines whether changes to the ticket can be processed, and if so, which reissue methods are applicable to processing the ticket. If the reconstructed ticket does not permit any changes to be made, the reissue method logic 56 prices (101) an entirely new ticket satisfying the new desired travel, and optionally computes any residual value that the ticket may have, which may be zero.

Since the number of reissue methods may be large (e.g., for ATPCO category 31 (voluntary changes) and ATPCO category 33 (voluntary refunds) processing, the number of possible combinations can be exponential in the number of fares on the original ticket), it is desirable to eliminate non-applicable reissue methods as early as possible to avoid unnecessary computation. Reissue methods are often generalized such that they apply to large sets of possible tickets. At an early stage of the reissue method determination process 68, the reissue method logic 56 filters (102) the reissue methods down to only the set of reissue methods that applies to the actual reconstructed ticket or tickets being considered. The properties of a reconstructed ticket, such as whether it has been partially flown and whether the new transaction is within the "ticketing time limit" of the original ticket, and information present on the ticket are compared to the each of the reissue methods. The reissue method logic 56 eliminates any reissue methods whose requirements are violated by all of the candidate reconstructed tickets.

By filtering (104) the remaining reissue methods with respect to the constraints of the query for new travel, the reissue method logic 56 attempts to eliminate more of the reissue methods from consideration. For example, if the new travel specified in the query does not include any travel on the outbound travel date of the original ticket, any reissue method that requires keeping the flights of the first fare component can be discarded. In some embodiments, the reissue method logic 56 performs more aggressive filtering including pre-evaluating advance purchase restrictions using the advance purchase processing mechanism from the reissue method based on the query-specified desired departure time range. Performing more aggressive filtering may also include determining whether a reissue method enables the fare breakpoints of the original trip to remain unchanged given the requested new trip.

The reissue method logic 56 considers reissue methods for possible pricings of possible replacement itineraries by maintaining a status vector over the possible reissue methods in data structures representing partial pricing solutions of the replacement itineraries. A partial pricing solution includes a fare and itinerary that partially satisfy the new travel request. For example, a replacement ticket may be composed of multiple partial solutions each including a flight segment of the replacement itinerary and a fare associated with the flight segment. One technique to track applicable reissue methods is to use a status vector. A status vector of a partial pricing solution indicates the types of reissue methods that apply to the partial solution. In some embodiments, the position of a bit represents a reissue method and a "1" in the status vector at the position represents that at a particular stage of processing, the corresponding reissue method might still be possible for this partial pricing solution (in other words, the reissue method is not known to be inapplicable on all possible reissue pricing solutions which can be built from this partial pricing solution). Other approaches could be used.

In some embodiments, two "special" reissue methods are allocated and assigned to the first two bits in a status vector. These bits represent two possibilities. The first bit represents a reissue method that involves pricing a completely new ticket. Partial pricing solutions for flights in the future, using fares that are currently available, and which do not require waiving any fare rules may qualify for this special method. The second bit represents a reissue method that enables total reuse of the original ticket. This type of reissue method applies to the ticketed flights using the ticketed fares, regardless of whether rules fail or not. Under this reissue method, the passenger should be able to keep their ticket and inventory without change penalty regardless of any other constraints.

The reissue method logic 56 determines (106 of FIG. 9A) valid reissue methods for each of the partial pricing solutions and updates the corresponding status vectors of the partial pricing solutions. A status vector of a particular partial solution having all zero bits indicates that no reissue method, including a whole new ticket, would allow the partial solution to occur as part of a replacement ticket. The reissue method logic 56 filters (108) the partial solutions having zero status vectors from the partial solutions having non-zero status vectors and eliminates the zero partial solutions from consideration.

The fare rules associated with the partial solutions determine the pricing of a replacement ticket composed of the partial solutions. When applying fare rules in a fare-component context (i.e., when the flights to paid for by the fare have been chosen, but the other flights in the new trip are not yet known), the system evaluates whether the flights being considered are all present, in sequence, and on the original ticket. If the flights being considered are all present in sequence on the original ticket and booked in the same inventory, the flights are considered unchanged flights; otherwise the flights are changed flights. Similarly, the fare itself can be checked to see if the fare occurs on the ticket, and whether it is a historical fare or a current fare.

The reissue method logic 56 evaluates (110 of FIG. 9B) the rules of the partial pricing solutions to determine the requirements they place on which type of fare is used on which type of flight sequence. In some cases, based on the evaluation, the reissue method logic 56 eliminates reissue methods associated with the partial pricing solutions based on the requirements the eliminated reissue methods would place on the type of fare used on and the type of flight sequence. However, the reissue method logic 56 may not be capable of completely evaluating some of the rules governing the combination of fares and flights at this time. One example is the requirement that ticketed fares be used up until the first change, and current fares used thereafter. The reissue method logic 56 may evaluate governing the combination of fares at multiple times throughout the reissue method determination process 68. For example, some combinations of fares may "FAIL" immediately (e.g. a ticketed fare on a changed flight); some combinations of fares may "FAIL" when combined into priceable units (e.g. the combination into a priceable unit of a changed flight with a ticketed fare on a later unchanged flight); and combinations of fares may "FAIL" at the final stage when priceable units are combined into new trips (e.g. two priceable units that each obeys the restriction independently, but where the combination of a particular fare and flight puts a ticketed fare on a ticketed flight after the first change). The result of the rule evaluation (110) is either a PASS, FAIL, or DEFER.

A determination is made (112) as to whether the rule check of step 110 returns a FAIL at each level of processing, as larger partial solutions are built up from smaller pieces. If a FAIL result is not returned, the partial solutions are passed through to the next higher level. At the highest level, if the rule still does not fail, the result is passed on to the next stage of processing.

When a normal rule check would return FAIL, the reissue method logic 56 determines (114) if any reissue method would allow the rule to be evaluated differently, and if so, what the result would be under the less restrictive evaluation. Some reissue methods allow the waiving of certain fare rules or modify the behavior of the rule evaluation process 110. For example, one or more reissue methods may enable rules that impose advance purchase requirements to be modified to allow partially flown trips to be re-priced. As long as the reissue methods change the rule evaluation behavior such that the new behavior is less restrictive than the normal behavior, a simple modification to the rule evaluation process is sufficient. Because rule applications only become less restrictive under the reissue methods, a PASS or DEFER result would also apply under the less restrictive rule as directed by the reissue method. This mechanism can be modified to handle the case where the rule evaluation becomes more restrictive under a particular reissue method, or where there are multiple levels of progressively loosened restrictions. All that is required is that the application of the rule evaluation proceeds from most restrictive to least restrictive.

If the reissue method logic 56 determines, for a given partial solution, that there are no reissue methods that could modify the violated rule so that it does not still fail, the reissue method logic 56 eliminates (116) the partial solution from consideration. If however a reissue method that enables modification of a violated rule is determined (114), the status vector of the partial solution is updated (118) to include the reissue methods that would allow the modified rule check. This updated status vector is combined with the existing status vector of the partial solution (e.g., using a logical AND operation) to produce a final status vector indicative of all reissue methods that are valid for the partial solution. The process 68 checks (120) whether an entire ticket has been constructed and keeps looping over larger and larger partial solutions until the entire ticket is constructed. Once the entire ticket is constructed, the process 68 outputs (122) the constructed ticket to a subsequent process (e.g., faring process 70).

Faring Process

Figure 10A:
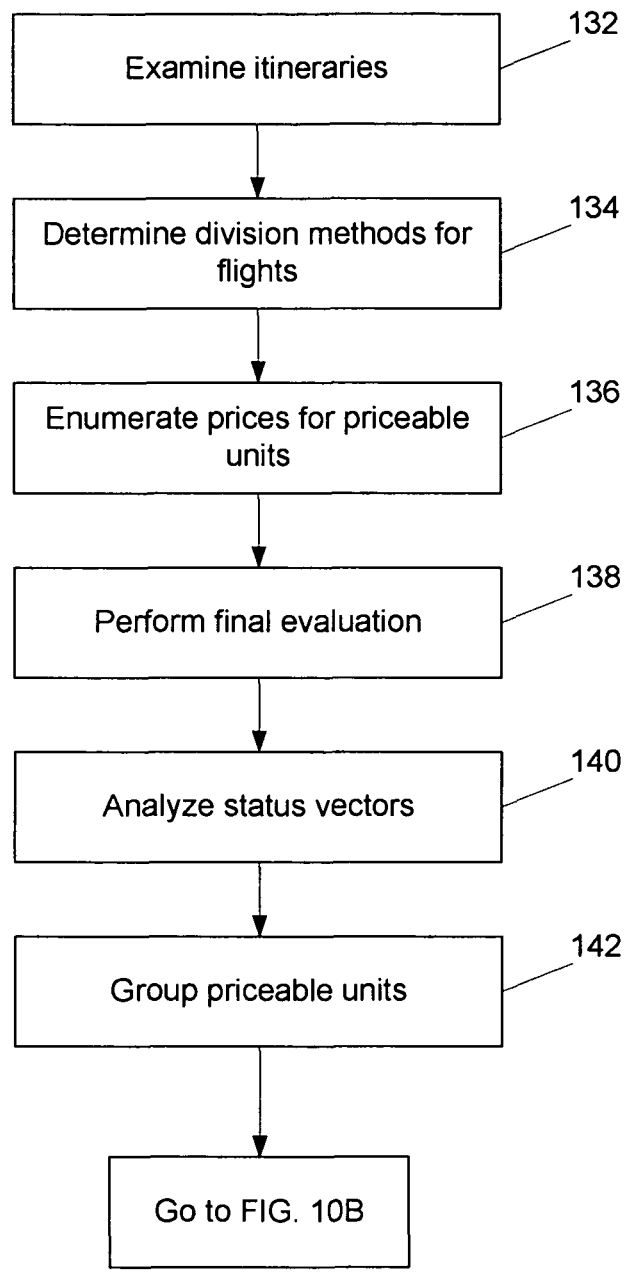
FIGS. 10A-10B collectively show a flow chart of the faring process of FIG. 5 in further detail.
Figure 10B:
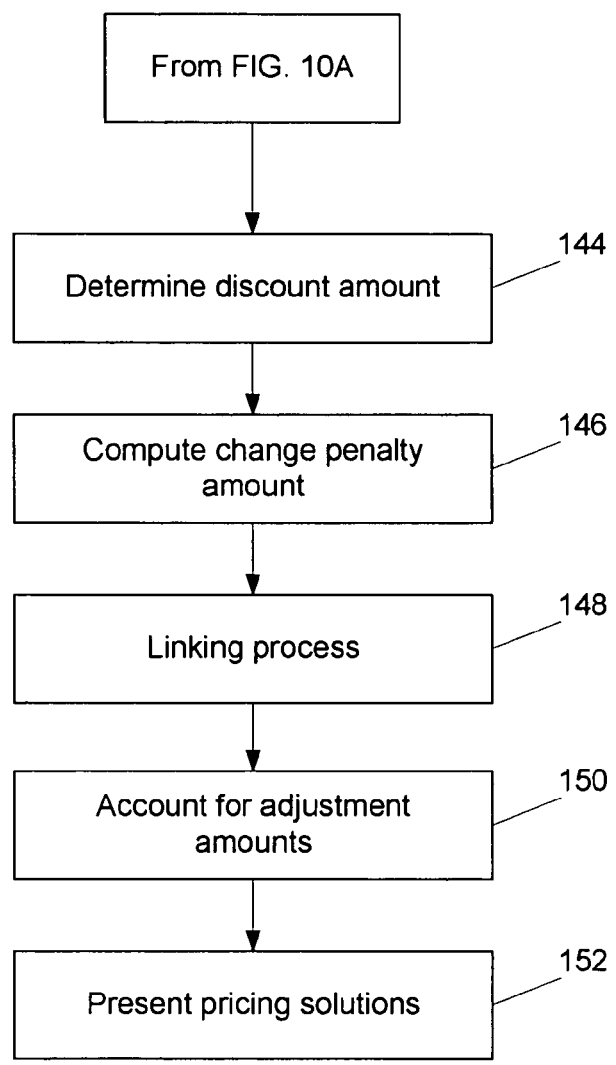

Referring to FIGS. 10A-10B, the faring process 70 (FIG. 5) by which the faring logic 58 determines pricing solutions for the replacement itineraries is shown. As described above, there are a number of conditions that reissue methods may apply to the new ticket. Examples are that the flights of the first fare component of the old ticket appear on the new ticket or that none of the fare breakpoints of the old ticket may be changed.

The faring logic 58 examines (132 in FIG. 10A) the sequences of flights that are to be considered for the new travel request query. For each itinerary combination that covers the entire new trip, the faring logic 58 determines (134) division methods for dividing the flights into fare components. For each of these division methods (potential fare components), the faring process 70 enumerates (136) fares applicable to the flights. Fares that are found by the rule evaluation process (including reissue method evaluation) to be possibly valid for the flights are carried forward to the priceable unit construction process. At the priceable-unit level, the faring logic 58 has access to both the exact flights and the fare breakpoints that will be used to construct a complete priceable unit. Priceable units that pass rule evaluation (including reissue method evaluation) at this level go forward to the linking process. During linking, the faring logic 58 performs a final evaluation (138) of the reissue methods with respect to the ticket conditions, and disqualifies the methods that do not satisfy their conditions. The faring logic 58 analyzes (140) the status vectors of each priceable units and groups (142) together the priceable units that have some valid reissue methods in common. Reissue methods typically remain for each group of priceable units, since the reissue methods tend to be disjoint in the types of changes that they allow. However, it is still possible that many groups of priceable units will satisfy more than one method. For priceable units that contain only current fares used on flights in the future, the all-new-ticket method will typically apply in addition to any carrier-specified methods that may be available.

For each group of pricing solutions, the faring logic 58 determines (144) if the corresponding reissue methods allow the price of the previous ticket (i.e. previously paid fare or tax amounts) to be applied toward the value of the new ticket. Reissue methods that specify an "all-new-ticket" method will generally prohibit such discounts. The faring logic 58 also computes (146) any change penalty amount for each reissue method. The sum of the original ticket discount and the change penalty is referred to as the "total adjustment amount."

The faring logic 58 produces complete pricing solutions from priceable units through a process 148 called "linking." During the linking process 148, the faring logic 58 combines the priceable units within each group to form a set of pricing solutions for replacement tickets that satisfy the user's query. To account (150) for any adjustment amounts, the faring logic 58 subtracts out the value, if any, of the original ticket (fare or tax amounts) from the price of the replacement ticket and adds to the price of the replacement ticket any penalty amounts that have been calculated.

In some embodiments, such as when using the refund/reissue logic 19 in conjunction with a travel planning system, as described in U.S. Pat. No. 6,275,808, the pricing solutions are represented using a compact structure called a "pricing graph." The pricing graph is divided into groups of pricing solutions based on the sets of reissue methods that are valid for generating the groups of pricing solutions. The faring logic 58 loops over all possible reissue methods for each group of complete pricing solutions (represented by the reissue-method status vector on the link-fringe) and tags the group of complete pricing solutions corresponding to a reissue method with the resulting adjustments so that the groups of solutions as represented in the graph have the correct total cost.

The pricing solutions are presented (152) to the user 16 at the client 14. In some embodiments, only the group of complete pricing solutions corresponding to the reissue method which results in the lowest total adjustment amount is presented to the user 16. After the server 12 receives a ticket selection from the user 16, the booking process 72 (FIG. 5) provides the user 16 a booking and reservation for the ticket selection.

User Interface

Referring to FIGS. 11A-11E, different user interfaces may be used to present replacement ticket options to the user 16 and to highlight the differences between the existing purchased ticket and the replacement ticket options returned by the search engine 18.

FIG. 11A shows a user interface 160 that displays a summary of replacement ticket options returned by the search engine 18.

FIG. 11B shows a user interface 162 that displays the itinerary of the existing ticket above possible replacement options to enable the user 16 to more easily compare and contrast the existing ticket and the replacement options. One disadvantage of this model is that the user may need to look back and forth between the existing ticket and the replacement options, comparing characteristic for characteristic, to determine the differences between the replacement option itineraries and the original ticket itinerary.

FIG. 11C shows a user interface 164 that attempts to solve this problem by highlighting the differences between each replacement itinerary and the original ticket itinerary. The highlighting in this instance is done in a different shade of color on a multi-colored display. See trips 1 and 3 under the Date, Flight times and Duration headings.

Figures 11D, 11E:
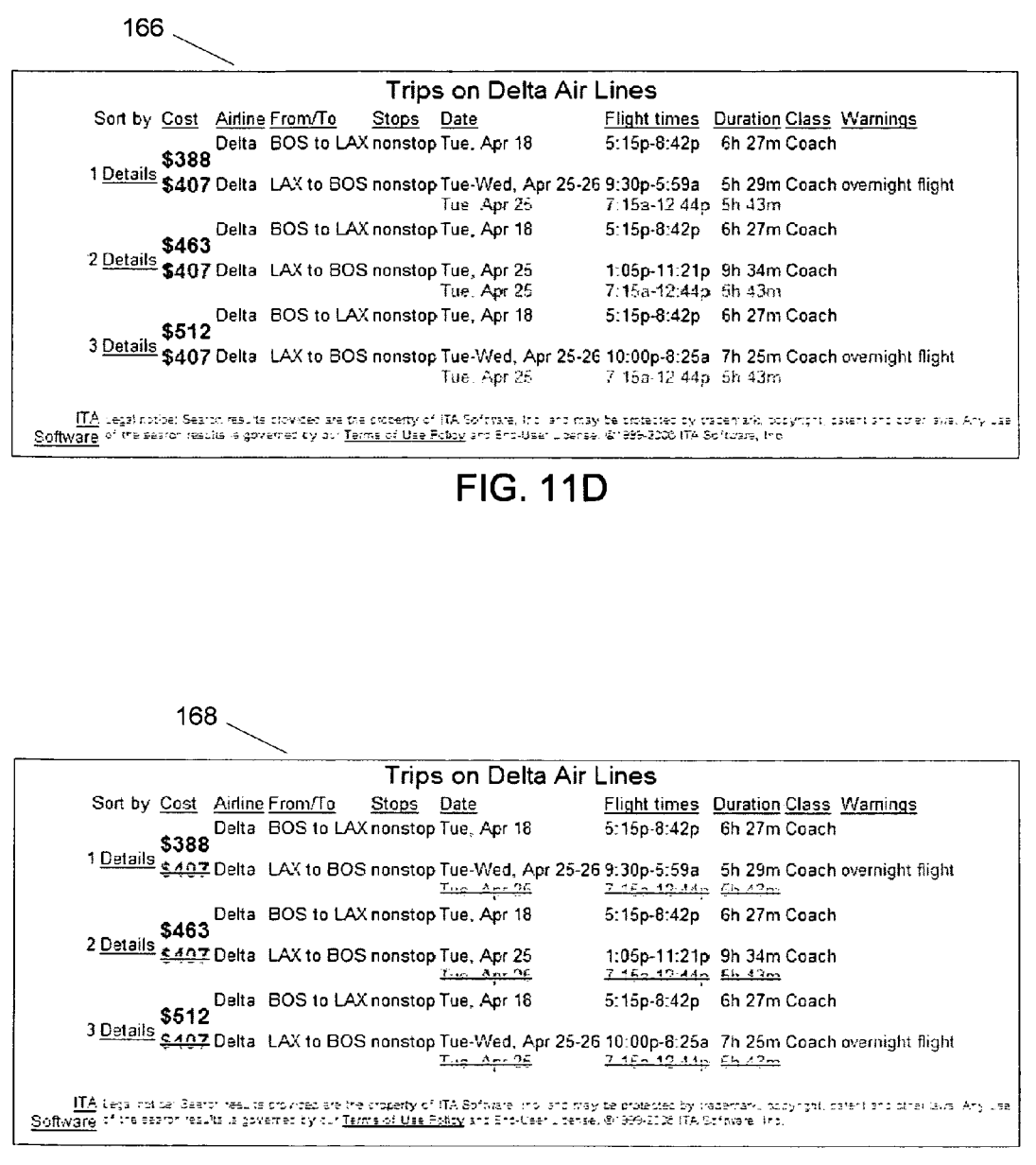

FIG. 11D shows a user interface 166 that displays the differences between the existing ticket and a replacement option inline with each replacement itinerary. Although the user interface 166 uses more space than the user interface 164 of FIG. 11C, it reduces the difficulty and distance the users' eyes must travel back-and-forth between original and replacement itineraries. Again, different shading (of gray or color) is used to highlight the differences.

FIG. 11E shows a user interface 168 that replaces the differences displayed as highlighted text in the user interface 166 of FIG. 11D with strikethrough text. In some embodiments, one or more of the user interfaces 164, 166, and 168 include a set of buttons that controls whether or not to display differences between the original ticket and the candidate replacement itineraries. For example, if the user 16 does not want to see the differences shown in one or more possible replacement itineraries, the user 16 can select a button or multiple buttons that causes the differences to disappear.

The user interfaces 164, 166, and 168 may also include controls that enable the user 16 sort the possible replacement ticket options displayed. In addition to enabling the user 16 to sort replacement ticket options by price, departure time, carrier, duration, class of service, warnings, and other standard travel parameters, the controls also enable the user 16 to sort replacement ticket options according to the number of differences between the replacement itineraries and the itinerary of the existing ticket. For example, the user 16 may prefer those replacement options for which the number of differences is the smallest.

The user interfaces 160, 162, 164, 166, and 168 may include controls that enable the user 16 to select and highlight various types of differences between the existing ticket and the replacement ticket options. For example, if the user 16 decides to take an earlier flight, the user 16 may want to highlight only those differences that correspond to originating flights. Similarly, the user 16 may want to un-highlight differences that are of no interest.

When specifying a search for options to replace an existing ticket, a user may specify their search differently from the initial search they performed when they bought their existing ticket. Depending on what information is stored and captured about the user's intent (i.e., the characteristic(s) of the existing ticket that the user 16 is explicitly attempting to change), the user interfaces 160, 162, 164, 166, and 168 can discriminate between explicitly requested differences between the existing ticket and candidate replacement options and consequential differences that were not explicitly requested.

For example, when highlighting differences between the original ticket and the possible replacement options, the user interfaces 160, 162, 164, 166, and 168 may highlight explicit differences and consequential difference in different colors or formats. In some embodiments, the user interfaces 160, 162, 164, 166, and 168 highlight differences between the travel options that were available when the search for the original ticket was performed and the travel options that are available at the time of the user's query for replacement ticket options. In some embodiments, the user interfaces 160, 162, 164, 166, and 168 include a separate "details page" for displaying the differences between the original ticket and a possible replacement options in an inline arrangement.

QPX Implementation

The travel planning system 10 and its operations may be implemented using the QPX travel planning system, as described in U.S. Pat. No. 6,275,808 and briefly discussed above. One technique to use the refund/reissue logic 19 with the travel planning system, as described in U.S. Pat. No. 6,275,808 involves certain modifications to the low fare search (LFS) algorithm described in that patent.

As described above, the reissue method can use a status vector to track applicable reissue methods. To adopt the LFS technique for use with the refund/reissue logic 19, the LFS technique is modified to track potential reissue methods using the status vector.

Thus, when a fare is first considered at the faring-market level rule evaluation, the reissue-method status vector is initialized, e.g., to all ones because the reissue methods are initially assumed to pass until they fail. The rule checkers (used at all levels of rule checks) are modified to relax rules, and when the rule checks relax the rules the rule checks return a marker status vector indicating the subset of reissue methods which allow the particular relaxation that was performed. For fare-components, priceable unit-labels, link-label-sets, and link-fringes, each data structure is provided with an additional field, "REISSUE-STATUS," which is a status vector over the reissue methods, indicating the state (e.g. known to fail, unsatisfied constraint, etc.) for the set of partial pricing solutions, at that particular solution stage, which the fare-component, priceable unit-label, link-label-set, and link-fringe data structures represent.

When considering fares after the faring-market level rule checks, logic is added to evaluate each reissue method along with the set of marker status vectors returned by the rule checker to produce a reissue status vector. The resulting reissue status vector is passed directly along to the fare-component level rule check. When considering combinations of fares with flights, after the fare-component level rule checks, logic is added to evaluate each reissue method in the context of the fare component, in addition to the set of markers returned by the rule checker. The resulting reissue status vector is stored on the fare-component. When considering flights in the context of a priceable-unit, after priceable-unit level rule checks, logic is added to evaluate each reissue method in the context of the full set of flights of the priceable unit in addition to the set of markers returned by the faring market set level and priceable-unit level rule checkers.

The priceable unit level rule checker logic considers each reissue method that is listed as a possibility in all fare-components of the potential new priceable-unit, as well as being a possibility in any markers returned by rule checks. The resulting reissue status vector is stored on the priceable unit-label. When considering sets of priceable-unit-labels to combine into a link-label-set, logic is added to evaluate the reissue methods that are compatible with every priceable-unit-label. Cross-slice data structures are set up so that they keep track of the range of flights from the original ticket that are reused, and also the range of fare breakpoints from the original ticket that are reused, and different link-label-sets are produced for different values of these ranges. The resulting reissue status vector is stored on the link-label-set.

When performing final linking, the cross-slice summary information includes the first flight from the original ticket that was not reused, and the first faring-market of the solution that was not on the original ticket. Different link-fringes are produced for each different value of these fields. The final evaluation of many reissue-method conditions, such as "must reuse first coupon," and "must keep same fare breakpoints" occurs at this stage using the cross-slice summary information. The final reissue status vector for the complete set of solutions represented by a link-fringe is stored in the link-fringe data structure.

Many aspects of QPX functionality described, for example, in U.S. Pat. No. 6,275,808 can be extended to applications that search for ticket changes. Examples of these include "sell-up" functionality in which a diverse set of possible pricing solutions are shown for the same ticket change, including refundable versus nonrefundable options, different cabin classes, and different fare restrictions. Other QPX functionality includes offering split-ticket and multiple point-of-sale options, the use of calendar queries for allowing comparison shopping over a large number of dates, the use of "anywhere" queries for allowing comparison shopping over a large number of possible new destinations, and changing frequent-flyer tickets.

The reissue method process 68 described above (see FIG. 5) considers all reissue methods for possible pricings of possible replacement itineraries examining the status vectors over the possible reissue methods, as generally described above.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method for managing changes to a previously purchased ticket, the method comprising:
   receiving, by one or more computers, a travel request for a journey, including a request to use a portion of a previously purchased ticket and information regarding travel arrangements and terms under which the previously purchased ticket was issued;
   determining that available information in the previously purchased ticket and a passenger name record (PNR) associated with the previously purchased ticket is insufficient to unambiguously determine how the previously purchased ticket was originally priced;
   locating, by one or more computers, a married segment indicator associated with first and second married flight segments of the previously purchased ticket, with a married segment indicator associated with flight segments to indicate flight segments of inventory held in a passenger name record (PNR) are to be considered together;
   reconstructing, by the one or more computers, each of a plurality of terms applying to the previously purchased ticket as of a date the previously purchased ticket was issued, by:
   querying a database of historical information using received information regarding travel arrangements and terms of the previously purchased ticket to identify a plurality of candidate fare records that existed at the time the previously purchased ticket was issued and that correspond to information supplied in the query, wherein each of a plurality of the fare records is associated with information comprising a carrier, a city pair, a fare basis code, and a time period during which information in the fare record is valid;
      filtering the plurality of candidate fare records by excluding those candidate fare records having associated rules inconsistent with the travel arrangements or terms of the previously purchased ticket; and
      selecting as a reconstructed ticket a candidate fare record having associated rules consistent with the travel arrangements and terms of the previously purchased ticket;
   determining, by the one or more computers, based on aspects of the reconstructed ticket, whether changes to flight segments of the previously purchased ticket can retain existing bookings of remaining flight segments corresponding to the first and second married flight segments of the previously purchased ticket;
   if ticket changes can retain both existing bookings of the first and second married flight segments,
      constructing by the one or more computers a first replacement ticket including changes to the previously purchased ticket, the replacement ticket including the first and second married flight segments of the previously purchased ticket using both existing bookings; otherwise,
   if the ticket changes affect at least one of the first and second married flight segments where the ticket changes cannot retain an existing booking of at least one of the first and second married flight segments,
      constructing a second replacement ticket by the one or more computers using current availability information for the first and second married flight segments.

2. The method of claim 1, further comprising:
   determining that the changes affect the existing booking of one of the first and second married flight segments of the previously purchased ticket; and
   discarding a candidate replacement ticket including the married flight segment, the candidate replacement ticket including the changes to the previously purchased ticket.

3. The method of claim 1, further comprising:
   receiving a response to an availability query associated with the first replacement ticket, the response including a married segment indicator associated with the first and second married flight segments of the replacement ticket.

4. The method of claim 3, further comprising:
   marking replacement itineraries with potential marriage indicators for sequences of flights that overlap partially with the inventory currently held in the PNR;
   merging availability counts from these sequences of flights with the inventory from the PNR, in accordance with the marriage indicators if the responses contain a married segment indicator for a same subsequence as a married subsequence currently held in the PNR; and
   reissuing the first replacement ticket by editing the PNR.

5. The method of claim 1, wherein the change is a change that affects a destination airport of one of the first and second married flight segments.

6. The method of claim 1, further comprising using the first and second married flight segments from the previously purchased ticket when constructing the first replacement ticket if the changes do not affect the first and second married flight segments of the previously purchased ticket.

7. A system for managing changes to a previously purchased ticket, the system comprising:
   one or more processors;
   one or more memory modules; and
   instructions stored on the one or more memory modules and operable when executed by the one or more processors to cause operations comprising:
      receiving a travel request for a journey, including a request to use a portion of a previously purchased ticket and information regarding travel arrangements and terms under which the previously purchased ticket was issued;
      determining that available information in the previously purchased ticket and a passenger name record (PNR) associated with the previously purchased ticket is insufficient to unambiguously determine how the previously purchased ticket was originally priced;
      locating a married segment indicator associated with first and second married flight segments of the previously purchased ticket, with a married segment indicator associated with flight segments to indicate flight segments of inventory held in a passenger name record (PNR) are to be considered together;
      reconstructing each of a plurality of terms applying to the previously purchased ticket as of a date the previously purchased ticket was issued, by:
      querying a database of historical information using received information regarding travel arrangements and terms of the previously purchased ticket to identify a plurality of candidate fare records that existed at the time the previously purchased ticket was issued and that correspond to information supplied in the query, wherein each of a plurality of the fare records is associated with information comprising a carrier, a city pair, a fare basis code, and a time period during which information in the fare record is valid;

filtering the plurality of candidate fare records by excluding those candidate fare records having associated rules inconsistent with the travel arrangements or terms of the previously purchased ticket; and selecting as a reconstructed ticket a candidate fare record having associated rules consistent with the travel arrangements and terms of the previously purchased ticket;

determining, based on aspects of the reconstructed ticket, whether changes to flight segments of the previously purchased ticket can retain existing bookings of remaining flight segments corresponding to the first and second married flight segments of the previously purchased ticket;

if ticket changes can retain both existing bookings of the first and second married flight segments, constructing a first replacement ticket including changes to the previously purchased ticket, the replacement ticket including the first and second married flight segments of the previously purchased ticket using both existing bookings; otherwise, if the ticket changes affect at least one of the first and second married flight segments where the ticket changes cannot retain an existing booking of at least one of the first and second married flight segments, constructing a second replacement ticket using current availability information for the first and second married flight segments.

8. The system of claim 7, wherein the instructions further cause operations comprising:

determining whether the changes affect the existing booking of one of the first and second married flight segments of the previously purchased ticket; and if so, discarding a candidate replacement ticket including the married flight segment, the candidate replacement ticket including the changes to the previously purchased ticket.

9. The system of claim 7, wherein the instructions further cause operations comprising:

receiving a response to an availability query associated with the first replacement ticket, the response including a married segment indicator associated with the first and second married flight segments of the replacement ticket.

10. The system of claim 7, wherein the instructions further cause operations comprising:

receiving responses to one or more availability queries for overlapping sequences of flights, marking replacement itineraries with potential marriage indicators for sequences of flights that overlap partially with the inventory currently held in the PNR;

merging availability counts from these sequences of flights with the inventory from the PNR, in accordance with the marriage indicators if the responses contain a married segment indicator for a same subsequence as a married subsequence currently held in the PNR; and reissuing the first replacement ticket by editing the PNR.

11. The system of claim 7, wherein the change is a change that affects a destination airport of one of the first and second married flight segments.

12. The system of claim 7, wherein the instructions further cause operations comprising:

using the first and second married flight segments from the previously purchased ticket when constructing the first replacement ticket if the changes do not affect the first and second married flight segments of the previously purchased ticket.

13. A non-transitory machine readable medium tangibly storing a computer program product for managing changes to a previously purchased ticket, comprising instructions operable to cause one or more processors to:

receive a travel request for a journey, including a request to use a portion of a previously purchased ticket and information regarding travel arrangements and terms under which the previously purchased ticket was issued;

determine that available information in the previously purchased ticket and a passenger name record (PNR) associated with the previously purchased ticket is insufficient to unambiguously determine how the previously purchased ticket was originally priced;

locate a married segment indicator associated with first and second married flight segments of the previously purchased ticket, with a married segment indicator associated with flight segments to indicate flight segments of inventory held in a passenger name record (PNR) are to be considered together;

reconstruct each of a plurality of terms applying to the previously purchased ticket as of a date the previously purchased ticket was issued, by:

querying a database of historical information using received information regarding travel arrangements and terms of the previously purchased ticket to identify a plurality of candidate fare records that existed at the time the previously purchased ticket was issued and that correspond to information supplied in the query, wherein each of a plurality of the fare records is associated with information comprising a carrier, a city pair, a fare basis code, and a time period during which information in the fare record is valid;

filtering the plurality of candidate fare records by excluding those candidate fare records having associated rules inconsistent with the travel arrangements or terms of the previously purchased ticket; and selecting as a reconstructed ticket a candidate fare record having associated rules consistent with the travel arrangements and terms of the previously purchased ticket;

determine, based on aspects of the reconstructed ticket, whether changes to flight segments of the previously purchased ticket can retain existing bookings of remaining flight segments corresponding to the first and second married flight segments of the previously purchased ticket;

if ticket changes can retain both existing bookings of the first and second married flight segments, construct a first replacement ticket including changes to the previously purchased ticket, the replacement ticket including the first and second married flight segments of the previously purchased ticket using both existing bookings; otherwise, if the ticket changes affect at least one of the first and second married flight segments where the ticket changes cannot retain an existing booking of at least one of the first and second married flight segments, construct a second replacement ticket using current availability information for the first and second married flight segments.

14. The medium of claim 13, further comprising instructions to:

determine whether the changes affect the existing booking of one of the first and second married flight segments of the previously purchased ticket; and if so, discard a candidate replacement ticket including the married flight segment, the candidate replacement ticket including the changes to the previously purchased ticket.

15. The medium of claim 13, further comprising instructions to: receive a response to an availability query associated with the first replacement ticket, the response including a married segment indicator associated with the first and second married flight segments of the replacement ticket.

16. The medium of claim 13, further comprising instructions to: receive responses to one or more availability queries for overlapping sequences of flights, mark replacement itineraries with potential marriage indicators for sequences of flights that overlap partially with the inventory currently held in the PNR; merge availability counts from these sequences of flights with the inventory from the PNR, in accordance with the marriage indicators if the responses contain a married segment indicator for a same subsequence as a married subsequence currently held in the PNR; and reissue the first replacement ticket by editing the PNR.

17. The medium of claim 13, wherein the change is a change that affects a destination airport of one of the first and second married flight segments.

18. The medium of claim 13, further comprising instructions to: use the first and second married flight segments from the previously purchased ticket when constructing the first replacement ticket if the changes do not affect the first and second married flight segments of the previously purchased ticket.

* * * * *

UNITED STATES PATENT AND TRADEMARK OFFICE
CERTIFICATE OF CORRECTION

PATENT NO. : 8,688,485 B2
APPLICATION NO. : 11/607444
DATED : April 1, 2014
INVENTOR(S) : Williamson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this
Thirtieth Day of May, 2017

Michelle K. Lee
*Director of the United States Patent and Trademark Office*